(12) United States Patent
He et al.

(10) Patent No.: US 12,323,482 B2
(45) Date of Patent: Jun. 3, 2025

(54) SERVICE MESH OFFLOAD TO NETWORK DEVICES

(71) Applicant: Intel Corporation, Santa Clara, CA (US)

(72) Inventors: Shaopeng He, Shanghai (CN); Cunming Liang, Shanghai (CN); Haitao Kang, Shanghai (CN); Hongjun Ni, Shanghai (CN); Jiang Yu, Shanghai (CN); Ziye Yang, Shanghai (CN); Anjali Singhai Jain, Portland, OR (US); Daniel Daly, Santa Barbara, CA (US); Yadong Li, Portland, OR (US); Ping Yu, Shanghai (CN); Bo Cui, Shanghai (CN); Jingjing Wu, Shanghai (CN); Liang Ma, Shannon (IE); Changpeng Liu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 17/238,960

(22) Filed: Apr. 23, 2021

(65) Prior Publication Data

US 2021/0243247 A1   Aug. 5, 2021

(51) Int. Cl.
*H04L 67/10* (2022.01)
*H04L 67/51* (2022.01)

(52) U.S. Cl.
CPC .............. *H04L 67/10* (2013.01); *H04L 67/51* (2022.05)

(58) Field of Classification Search
CPC .......... H04L 67/01; H04L 67/10; H04L 67/51
See application file for complete search history.

(56) References Cited

U.S. PATENT DOCUMENTS

| 8,839,370 B2 | 9/2014 | Singh et al. |
| 10,552,274 B1 | 2/2020 | Zhao et al. |

(Continued)

FOREIGN PATENT DOCUMENTS

| CN | 112513988 A | 3/2021 |
| WO | 2020030311 A1 | 2/2020 |

(Continued)

OTHER PUBLICATIONS

"HTTP and gRPC Transcoding", AIP-127, https://google.aip.dev/127, Last updated Aug. 22, 2019, 3 pages.

(Continued)

*Primary Examiner* — Jonathan A Bui
(74) *Attorney, Agent, or Firm* — Essential Patents Group, LLP; Christopher K. Gagne

(57) ABSTRACT

Examples described herein relate to a switch comprising a programmable data plane pipeline, wherein the programmable data plane pipeline is configured to provide microservice-to-microservice communications within a service mesh. In some examples, to provide microservice-to-microservice communications within a service mesh, the programmable data plane pipeline is to perform a forwarding operation for a communication from a first microservice to a second microservice. In some examples, to perform a forwarding operation for a communication from a first microservice to a second microservice, the programmable data plane pipeline is to utilize a reliable transport protocol.

20 Claims, 22 Drawing Sheets

(56) References Cited

U.S. PATENT DOCUMENTS

| | | | |
|---|---|---|---|
| 10,972,503 B1* | 4/2021 | Mohan | H04L 63/14 |
| 11,159,366 B1 | 10/2021 | Gawade et al. | |
| 2011/0299409 A1 | 12/2011 | Vobbilisetty et al. | |
| 2012/0106333 A1 | 5/2012 | Lee et al. | |
| 2015/0180736 A1 | 6/2015 | Leung | |
| 2015/0281128 A1 | 10/2015 | Sindhu | |
| 2016/0191392 A1 | 6/2016 | Liu et al. | |
| 2017/0085501 A1 | 3/2017 | Utgikar et al. | |
| 2017/0111274 A1 | 4/2017 | Bays et al. | |
| 2017/0195257 A1 | 7/2017 | Annaluru et al. | |
| 2017/0359217 A1 | 12/2017 | Ahuja et al. | |
| 2018/0024739 A1 | 1/2018 | Schmisseur | |
| 2018/0063018 A1 | 3/2018 | Bosch et al. | |
| 2018/0295045 A1 | 10/2018 | Bali et al. | |
| 2019/0044812 A1 | 2/2019 | Loftus et al. | |
| 2019/0044994 A1 | 2/2019 | Sarangam et al. | |
| 2019/0123984 A1* | 4/2019 | Nainar | H04L 43/062 |
| 2019/0190891 A1 | 6/2019 | Pillai et al. | |
| 2019/0230039 A1 | 7/2019 | Wang et al. | |
| 2019/0305985 A1 | 10/2019 | Liu | |
| 2019/0334770 A1 | 10/2019 | Xiang et al. | |
| 2020/0052982 A1* | 2/2020 | Nainar | H04L 43/028 |
| 2020/0053064 A1 | 2/2020 | Oprisan et al. | |
| 2020/0067818 A1* | 2/2020 | Jeuk | H04L 65/611 |
| 2020/0099628 A1 | 3/2020 | Parikh et al. | |
| 2020/0120168 A1* | 4/2020 | Nainar | H04L 45/30 |
| 2020/0133795 A1 | 4/2020 | Rhodes et al. | |
| 2020/0162380 A1 | 5/2020 | Pilkington et al. | |
| 2020/0169494 A1 | 5/2020 | K et al. | |
| 2020/0220848 A1* | 7/2020 | Patwardhan | H04L 63/061 |
| 2020/0236055 A1* | 7/2020 | Warnicke | H04L 69/163 |
| 2020/0236064 A1 | 7/2020 | Frankel et al. | |
| 2020/0236140 A1 | 7/2020 | Srinivasan et al. | |
| 2020/0287813 A1 | 9/2020 | Kutch et al. | |
| 2020/0310857 A1* | 10/2020 | Sharma | G06F 9/485 |
| 2020/0313955 A1 | 10/2020 | Kodeboyina et al. | |
| 2020/0314015 A1 | 10/2020 | Mariappan et al. | |
| 2020/0319812 A1 | 10/2020 | He et al. | |
| 2020/0344143 A1 | 10/2020 | K et al. | |
| 2020/0351332 A1* | 11/2020 | Palladino | H04L 67/1004 |
| 2021/0019194 A1* | 1/2021 | Bahl | H04L 67/1031 |
| 2021/0064430 A1 | 3/2021 | Srivastava et al. | |
| 2021/0075746 A1 | 3/2021 | Frankel | |
| 2021/0103403 A1 | 4/2021 | He et al. | |
| 2021/0117242 A1 | 4/2021 | Groenendaal et al. | |
| 2021/0194828 A1 | 6/2021 | He et al. | |
| 2021/0266253 A1 | 8/2021 | He et al. | |
| 2021/0352044 A1* | 11/2021 | Asveren | H04L 61/2517 |
| 2021/0409506 A1 | 12/2021 | Radi et al. | |
| 2022/0035689 A1* | 2/2022 | Raheja | G06F 9/5011 |
| 2022/0060569 A1 | 2/2022 | Wang et al. | |
| 2022/0142007 A1 | 5/2022 | Heydari | |
| 2022/0172037 A1* | 6/2022 | Kang | G06N 3/044 |
| 2022/0225065 A1* | 7/2022 | Doken | H04L 41/5051 |
| 2022/0294732 A1* | 9/2022 | Hart | H04L 47/2483 |
| 2024/0155024 A1* | 5/2024 | Palladino | G06F 8/73 |

FOREIGN PATENT DOCUMENTS

| | | |
|---|---|---|
| WO | 2020041569 A1 | 2/2020 |
| WO | 2020251828 A1 | 12/2020 |

OTHER PUBLICATIONS

"Improving Network Monitoring and Management with Programmable Data Planes", ONF, https://opennetworking.org/news-and-events/blog/improving-network-monitoring-and-management-with-programmable-data-planes/, Sep. 25, 2015, 5 pages.

"Intel® Ethernet Adaptive Virtual Function (AVF) Hardware Architecture Specification (HAS)", Intel Networking Division, Revision: 1.0, Feb. 2018, 90 pages.

"Introduction to Intel Ethernet Flow Director and Memcached Performance", Intel White Paper, Oct. 13, 2014, 6 pages.

"OpenStack Networking Guide", openstack, https://docs.openstack.org/mitaka/networking-guide/, updated Aug. 16, 2019, 3 pages.

"P4-16 Language Specification", version 1.2.1, The P4 Language Consortium, Jun. 11, 2020, 113 pages.

"Trellis", Overview, Trellis is an open-source multi-purpose L2/L3 leaf-spine switching fabric., https://docs.trellisfabric.org/1.12/index.html, © Copyright 2019, Open Networking Foundation, 4 pages.

Xing, Li, et al., "Hyperscale rte_flow toward production is really happening", DPDK https://dpdkbordeaux2019.sched.com/event/RmZG, Sep. 20, 2019, 25 pages.

Zhang, Jiao, et al., "Fast Switch-Based Load Balancer Considering Application Server States", IEEE, https://eeexplore.ieee.org/document/9061132.

Ian Pratt and Keir Fraser, Arsenic: A User-Accessible Gigabit Ethernet Interface, year 2001, IEEE, 0-7803-7016-3/01, pp. 67-76 (Year: 2001).

International Search Report and Written Opinion for PCT Patent Application No. PCT/US21/57130, Mailed Feb. 21, 2022, 10 pages.

Non-Published commonly owned U.S. Appl. No. 17/238,893, filed Apr. 23, 2021, 87 pages, Intel Corporation.

Notice of Allowance for U.S. Appl. No. 17/238,893, Mailed Feb. 9, 2022, 10 pages.

International Search Report and Written Opinion for PCT Patent Application No. PCT/US22/21795, Mailed Jun. 24, 2022, 12 pages.

"Networking architecture", Security Guide Docmentation, https://docs.openstack.org/security-guide/networking/architecture.html, Jul. 27, 2021, 6 pages.

"Transcoding HTTP/JSON to gRPC", Google Cloud Endpoints, cloud.google.com/endpoints/docs/grpc/transcoding, downloaded from the internet Jul. 28, 2021, 14 pages.

Bosshart, Pat, et.al., "P4: Programming Protocol-Indpendent Packet Processors", ACM SIGCOMM, Computer Communication Review, vol. 44, No. 3, Jul. 2014, 8 pages.

Colyer, Adrian, "Snap: a microkernel approach to host networking", the morning paper, https://blog.acolyer.org/2019/11/11/snap-networking, Nov. 11, 2019, 8 pages.

Crilly, Liam, "Introducing a Technoloy Preview of NGINX Support for QUIC and HTTP/3", https://www.nginx.com/blog/introducing-technology-preview-nginx-support-for-quic-http-3/, Jun. 10, 2020, 10 pages.

Diptanu Gon Choudhury, 'XDP-Programmable Data Path in the Linux Kernel', ;login: Spring 2018, vol. 43, No. 1, pp. 26-30, 2018, 6 pages.

Intel, "Intel Ethernet Adaptive Virtual Function (AVF) Hardware Architecture Specification (HAS)", Networking Division, Revision: 1.0, Feb. 2018, 90 pages.

Intel, "Introduction to Intel® Ethernet Flow Director and Memcached Performance", White Paper, Intel® Ethernet Flow Director and Memcached Performance, Copyright © 2014 Intel Corporation, 6 pages.

International Search Report and Written Opinion for PCT Patent Application No. PCT/US21/65177, Mailed Apr. 25, 2022, 10 pages.

International Search Report and Written Opinion for PCT Patent Application No. PCT/US22/11045, Mailed Apr. 25, 2022, 11 pages.

Irfan, Talal, "AF_XDP101L Getting Started With an In-Kernel network stack Bypass", Published in Emumba, https://blog.emumba.com/af-xdp-101-getting-started-with-an-in-kernel-network-stack-bypass-6e6901a285c8, Jun. 24, 2020, 10 pages.

Iyengar, Ed, et. al., "QUIC: A UDP-Based Multiplexed and Secure Transport draft-ietf-quic-transport-29", https://datatracker.ietf.org/doc/html/draft-ietf-quic-transport-29#page-23, Jun. 10, 2020, 187 pages.

Karlsson Magnus, et. al., 'The path to DPDK speeds for AF XDP', Linux Plumbers Conference, 2018, 9 pages.

Karlsson, Magnus, "Performance 140E 64-Byte Packets", Fast Packet Processing in Linux with AF_XDP, FOSDEM 2018, 1 page.

Li Xing, Alibaba, et. al., "Hyperscale rte_flow toward productoin is really happening" DPDK Data Pane Development Kit, DPDK Summit Bordeaux 2019, 25 pages.

Marcelo Abranches, et. al., 'A Userspace Transport Stack Doesn't Have to Mean Losing Linux Processing', 2020 EEE Conference on Nettwork Function Virtualization and Software Defined Networks (NFV-SDN), Dec. 24, 2020, 7 pages.

(56) References Cited

OTHER PUBLICATIONS

MVS, Janakiram, "Service Mesh—The New Battleground for the Platfor Wars", Sep. 20, 2020, 8 pages.

Nguyen Van Tu, et. al., 'Accelerating Virtual Network Functions with Fast-Slow Path Architecture using express Data Path', IEEE Transactions on Network and Service Management vol. 17. Issue 3, Jun. 5, 2020, 13 pages.

P4.org, "Improving Network Monitoring and Management with Progammable Data Planes", ONF, https://opennetworking.org/news-and-events/blog/improving-network-monitoring-and-management-with-programmable-data-planes/, Sep. 25, 2015, 7 pages.

P4.org, "In-band Network Telemetry (INT) Dataplane Specification", Version 2.1, The P4.org Applications Working Group. Contributions from Alibaba, Arista, CableLabs, Cisco Systems, Dell, Intel, Marvell, Netronome, VMware, Nov. 11, 2020, 56 pages.

Peterson, Larry, "Trellis", Dashboard / CORD—Wiki Home / Project and Domains of Use, https://wiki.opecord.org/display/CORD/Trellis, Jul. 27, 2021, 3 pages.

Postel, J., "User Datagram Protocol", RFC 768, Aug. 28, 1980, 3 pages.

Wiggins, Adam, "The Twelve-Factor App", VII. Port binding, https://12factor.net/port-binding, Last updated 2017, 1 page.

Final Office Action from U.S. Appl. No. 17/092,640 notified Jul. 5, 2024, 9 pgs.

Non-Final Office Action from U.S. Appl. No. 17/092,640 notified Dec. 22, 2023, 8 pgs.

Non-Final Office Action from U.S. Appl. No. 17/114,304 notified Jun. 4, 2024, 40 pgs.

Non-Final Office Action from U.S. Appl. No. 17/239,329 notified Jun. 17, 2024, 11 pgs.

Extended European Search Report from European Patent Application No. 21904046.6 notified Sep. 23, 2024, 11 pgs.

Final Office Action from U.S. Appl. No. 17/114,304 notified Oct. 16, 2024, 41 pgs.

Notice of Allowance from U.S. Appl. No. 17/092,640 notified Oct. 10, 2024, 18 pgs.

Extended European Search Report from European Patent Application No. 22792172.3 notified Dec. 3, 2024, 9 pgs.

Final Office Action from U.S. Appl. No. 17/239,329 notified Dec. 19, 2024, 23 pgs.

* cited by examiner

SERVICE MESH OFFLOAD TO NETWORK DEVICES

A service can be executed using a group of microservices and microservices communicate with other microservices using a network. Core network protocols that are used by these microservices are application layer (Layer 7) protocols such as Hypertext Transfer Protocol (HTTP), HTTP/2, Google RPC (gRPC), Kafka, MongoDB, and so forth. A service mesh is a dedicated infrastructure layer for facilitating service-to-service communications between microservices. Some Cloud Service Providers (CSPs) utilize Envoy proxy as the data plane for a service mesh. Some CSPs utilize Istio, AppMesh, or Open Service Mesh (OSM) for a control plane of a service mesh. However, in some cases, Envoy proxy introduces latency to microservice communications and latency can be undesirable.

DETAILED DESCRIPTION

Figure 1:
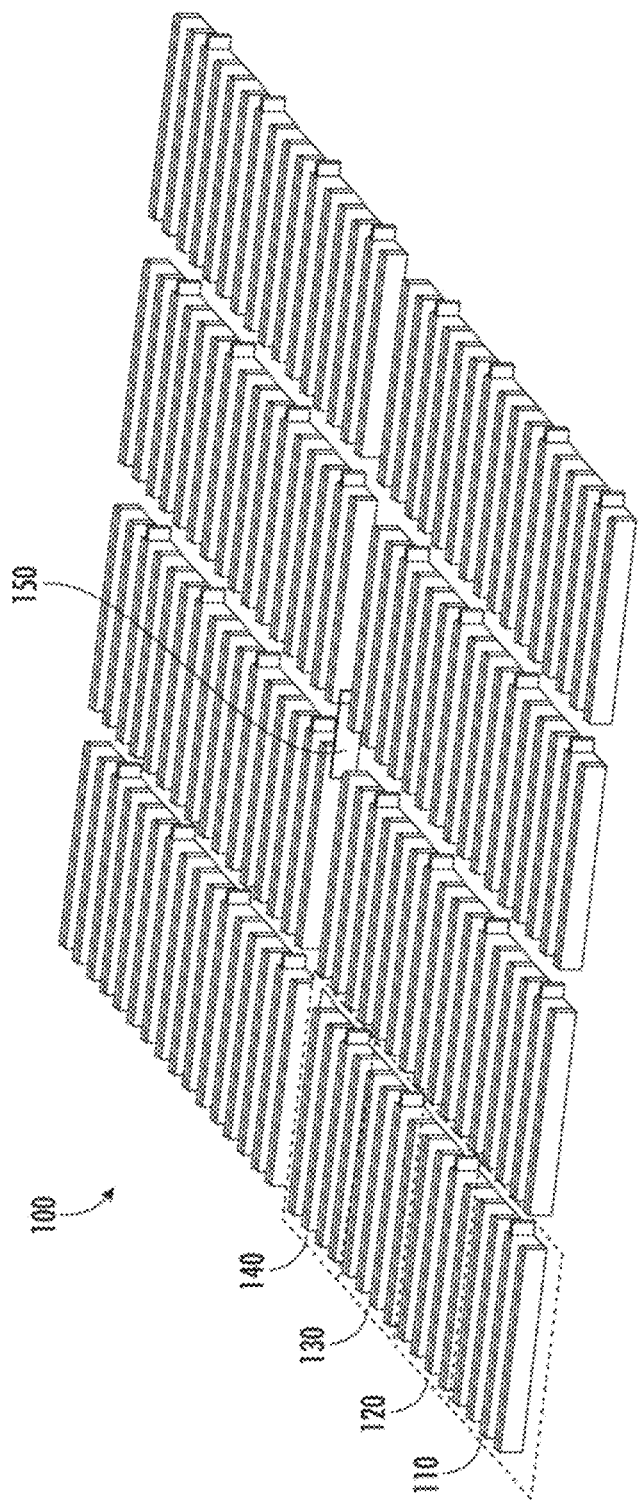
FIG. 1 is a simplified diagram of at least one embodiment of a data center for executing workloads with disaggregated resources.

FIG. 1 depicts a data center in which disaggregated resources may cooperatively execute one or more workloads (e.g., applications on behalf of customers) that includes multiple systems 110, 70, 130, 80, a system being or including one or more rows of racks, racks, or trays. Of course, although data center 100 is shown with multiple systems, in some embodiments, the data center 100 may be embodied as a single system. As described in more detail herein, each rack houses multiple nodes, some of which may be equipped with one or more type of resources (e.g., memory devices, data storage devices, accelerator devices, general purpose processors, GPUs, xPUs, CPUs, field programmable gate arrays (FPGAs), or application-specific integrated circuits (ASICs)). Resources can be logically coupled or aggregated to form a composed node or composite node, which can act as, for example, a server to perform a job, workload or microservices.

Various examples described herein can perform an application composed of microservices, where each microservice runs in its own process and communicates using protocols (e.g., application program interface (API), a Hypertext Transfer Protocol (HTTP) resource API, message service, remote procedure calls (RPC), or Google RPC (gRPC)). Microservices can be independently deployed using centralized management of these services. The management system may be written in different programming languages and use different data storage technologies. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery.

In the illustrative embodiment, the nodes in each system 110, 70, 130, 80 are connected to multiple system switches (e.g., switches that route data communications to and from nodes within the system). Switches can be positioned top of rack (TOR), end of row (EOR), middle of rack (MOR), or a position in a rack or row. The system switches, in turn, connect with spine switches 90 that switch communications among systems (e.g., the systems 110, 70, 130, 80) in the data center 100. In some embodiments, the nodes may be connected with a fabric using standards described herein or proprietary standards. In other embodiments, the nodes may be connected with other fabrics, such as InfiniBand or Ethernet. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different systems 110, 70, 130, 80. As such, some resources of a single node may be allocated to one managed node while other resources of the same node are allocated to a different managed node (e.g., one processor assigned to one managed node and another processor of the same node assigned to a different managed node).

The disaggregation of resources to nodes comprised predominantly of a single type of resource (e.g., compute nodes comprising primarily compute resources, memory nodes containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources. For example, because nodes predominantly contain resources of a particular type, resources of a given type can be upgraded independently of other resources. Additionally, because different resources types (processors, memory, storage, accelerators, etc.) typically have different refresh rates, greater resource utilization and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
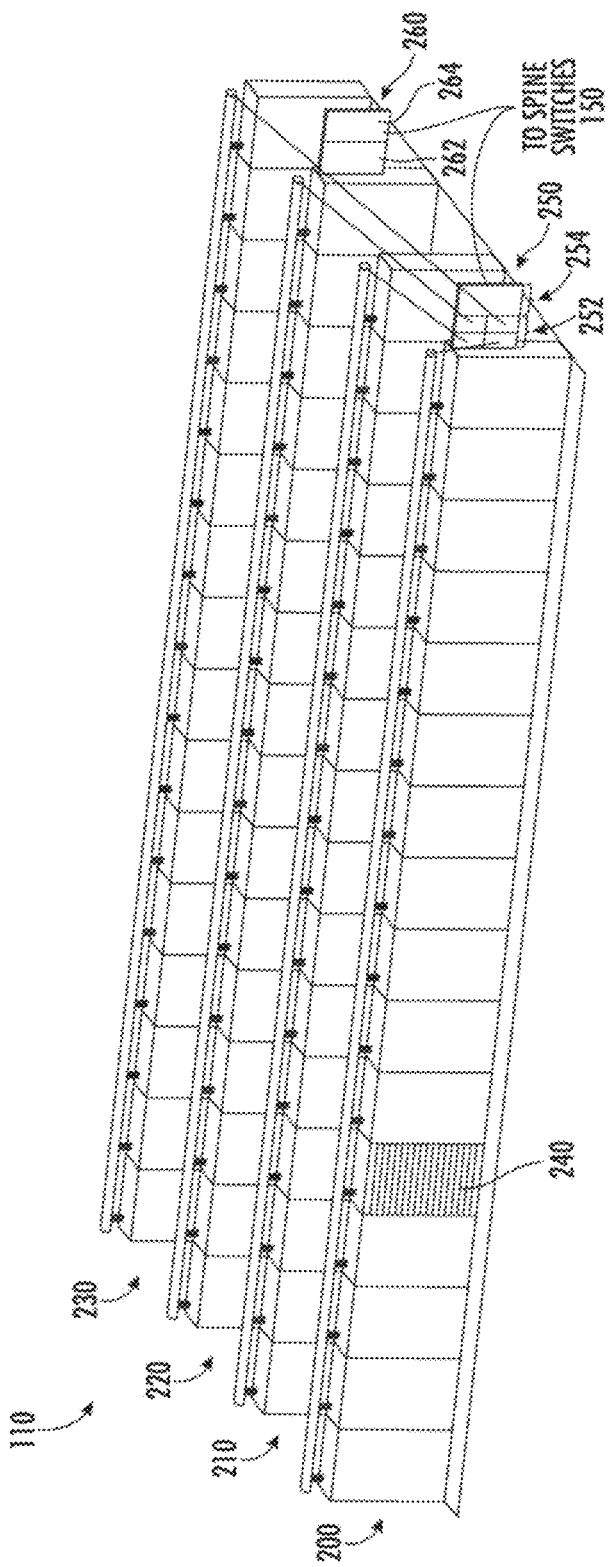
FIG. 2 is a simplified diagram of at least one embodiment of a system that may be included in a data center.

FIG. 2 depicts a system. A system can include a set of rows 200, 210, 220, 230 of racks 240. Each rack 240 may house multiple nodes (e.g., sixteen nodes) and provide power and data connections to the housed nodes, as described in more detail herein. In the illustrative embodiment, the racks in each row 200, 210, 220, 230 are connected to multiple system switches 250, 260. The system switch 250 includes a set of ports 252 to which the nodes of the racks of the system 110 are connected and another set of ports 254 that connect the system 110 to the spine switches 90 to provide connectivity to other systems in the data center 100. Similarly, the system switch 260 includes a set of ports 262 to which the nodes of the racks of the system 110 are connected and a set of ports 264 that connect the system 110 to the spine switches 90. As such, the use of the pair of switches 250, 260 provides an amount of redundancy to the system 110. For example, if either of the switches 250, 260 fails, the nodes in the system 110 may still maintain data communication with the remainder of the data center 100 (e.g., nodes of other systems) through the other switch 250, 260. Furthermore, in the illustrative embodiment, the switches 90, 250, 260 may be embodied as dual-mode optical switches, capable of routing both Ethernet protocol communications carrying Internet Protocol (IP) packets and communications according to a second, high-performance link-layer protocol (e.g., PCI Express or Compute Express Link) via optical signaling media of an optical fabric.

It should be appreciated that each of the other systems 70, 130, 80 (as well as additional systems of the data center 100) may be similarly structured as, and have components similar to, the system 110 shown in and described in regard to FIG. 2 (e.g., each system may have rows of racks housing multiple nodes as described above). Additionally, while two system switches 250, 260 are shown, it should be understood that in other embodiments, each system 110, 70, 130, 80 may be connected to a different number of system switches, providing even more failover capacity. Of course, in other embodiments, systems may be arranged differently than the rows-of-racks configuration shown in FIGS. 1-2. For example, a system may be embodied as multiple sets of racks in which each set of racks is arranged radially, e.g., the racks are equidistant from a center switch.

Figure 3:
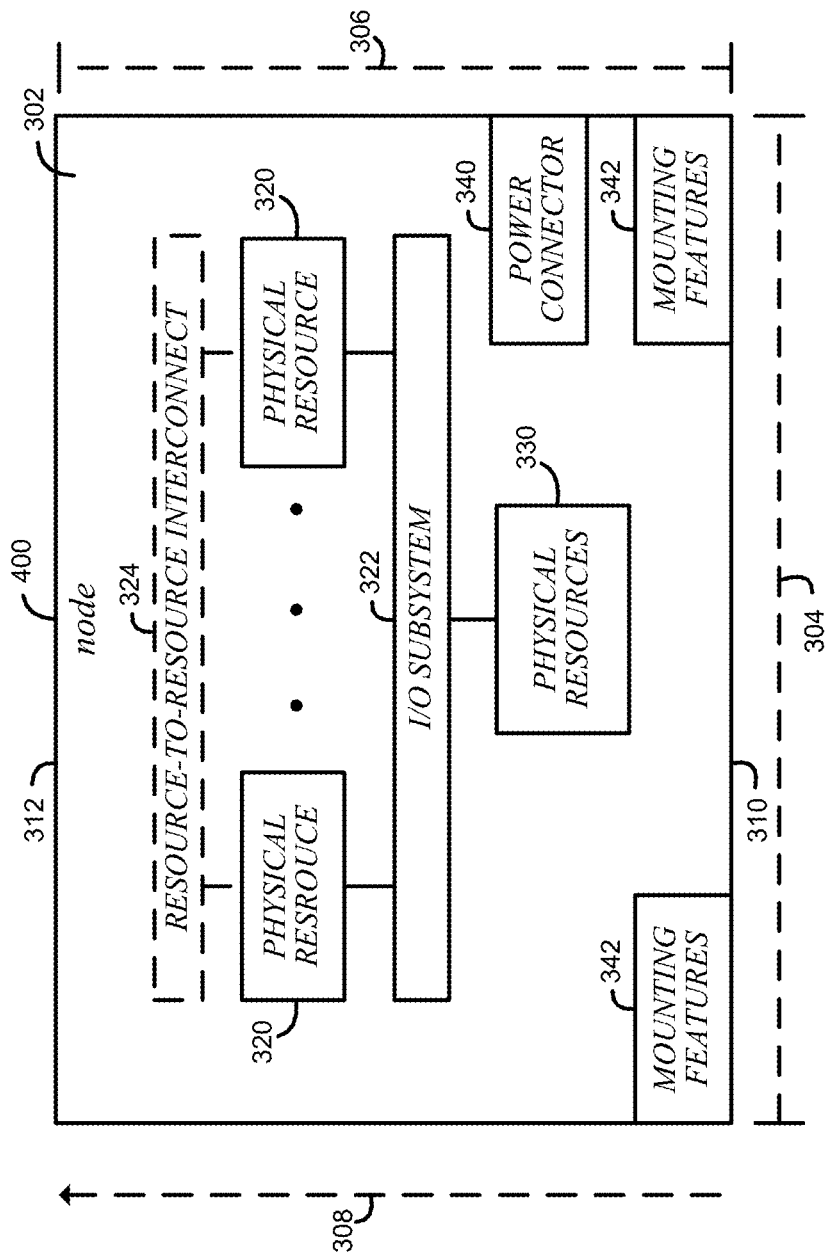
FIG. 3 is a simplified block diagram of at least one embodiment of a top side of a node.

Referring now to FIG. 3, node 400, in the illustrative embodiment, is configured to be mounted in a corresponding rack 240 of the data center 100 as discussed above. In some embodiments, each node 400 may be optimized or otherwise configured for performing particular tasks, such as compute tasks, acceleration tasks, data storage tasks, etc. For example, the node 400 may be embodied as a compute node 500 as discussed below in regard to FIG. 5, an accelerator node 600 as discussed below in regard to FIG. 6, a storage node 700 as discussed below in regard to FIGS. 7, or as a node optimized or otherwise configured to perform other specialized tasks, such as a memory node 800, discussed below in regard to FIG. 8.

Although two physical resources 320 are shown in FIG. 3, it should be appreciated that the node 400 may include one, two, or more physical resources 320 in other embodiments. The physical resources 320 may be embodied as any type of processor, controller, or other compute circuit capable of performing various tasks such as compute functions and/or controlling the functions of the node 400 depending on, for example, the type or intended functionality of the node 400. For example, as discussed in more detail below, the physical resources 320 may be embodied as high-performance processors in embodiments in which the node 400 is embodied as a compute node, as accelerator co-processors or circuits in embodiments in which the node 400 is embodied as an accelerator node, storage controllers in embodiments in which the node 400 is embodied as a storage node, or a set of memory devices in embodiments in which the node 400 is embodied as a memory node.

The node 400 also includes one or more additional physical resources 330 mounted to circuit board substrate 302. In the illustrative embodiment, the additional physical resources include a network interface controller (NIC) as discussed in more detail below. Of course, depending on the type and functionality of the node 400, the physical resources 330 may include additional or other electrical components, circuits, and/or devices in other embodiments.

The physical resources 320 can be communicatively coupled to the physical resources 330 via an input/output (I/O) subsystem 322. The I/O subsystem 322 may be embodied as circuitry and/or components to facilitate input/output operations with the physical resources 320, the physical resources 330, and/or other components of the node 400. For example, the I/O subsystem 322 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 322 is embodied as, or otherwise includes, a double data rate 4 (DDR4) data bus or a DDR5 data bus.

In some embodiments, the node 400 may also include a resource-to-resource interconnect 324. The resource-to-resource interconnect 324 may be embodied as any type of communication interconnect capable of facilitating resource-to-resource communications. In the illustrative embodiment, the resource-to-resource interconnect 324 is embodied as a high-speed point-to-point interconnect (e.g., faster than the I/O subsystem 322). For example, the resource-to-resource interconnect 324 may be embodied as a QuickPath Interconnect (QPI), an UltraPath Interconnect (UPI), PCI express (PCIe), or other high-speed point-to-point interconnect dedicated to resource-to-resource communications.

The node 400 also includes a power connector 340 configured to mate with a corresponding power connector of the rack 240 when the node 400 is mounted in the corresponding rack 240. The node 400 receives power from a power supply of the rack 240 via the power connector 340 to supply power to the various electrical components of the node 400. In some examples, the node 400 includes local power supply (e.g., an on-board power supply) to provide power to the electrical components of the node 400. In some examples, the node 400 does not include any local power supply (e.g., an on-board power supply) to provide power to the electrical components of the node 400. The exclusion of a local or on-board power supply facilitates the reduction in the overall footprint of the circuit board substrate 302, which may increase the thermal cooling characteristics of the various electrical components mounted on the circuit board substrate 302 as discussed above. In some embodiments, voltage regulators are placed on circuit board substrate 302 directly opposite of the processors 520 (see FIG. 5), and power is routed from the voltage regulators to the processors 520 by vias extending through the circuit board substrate 302. Such a configuration provides an increased thermal budget, additional current and/or voltage, and better voltage control relative to typical printed circuit boards in which processor power is delivered from a voltage regulator, in part, by printed circuit traces.

In some embodiments, the node 400 may also include mounting features 342 configured to mate with a mounting arm, or other structure, of a robot to facilitate the placement of the node 300 in a rack 240 by the robot. The mounting features 342 may be embodied as any type of physical structures that allow the robot to grasp the node 400 without damaging the circuit board substrate 302 or the electrical components mounted thereto. For example, in some embodiments, the mounting features 342 may be embodied as non-conductive pads attached to the circuit board substrate 302. In other embodiments, the mounting features may be embodied as brackets, braces, or other similar structures attached to the circuit board substrate 302. The particular number, shape, size, and/or make-up of the mounting feature 342 may depend on the design of the robot configured to manage the node 400.

Figure 4:
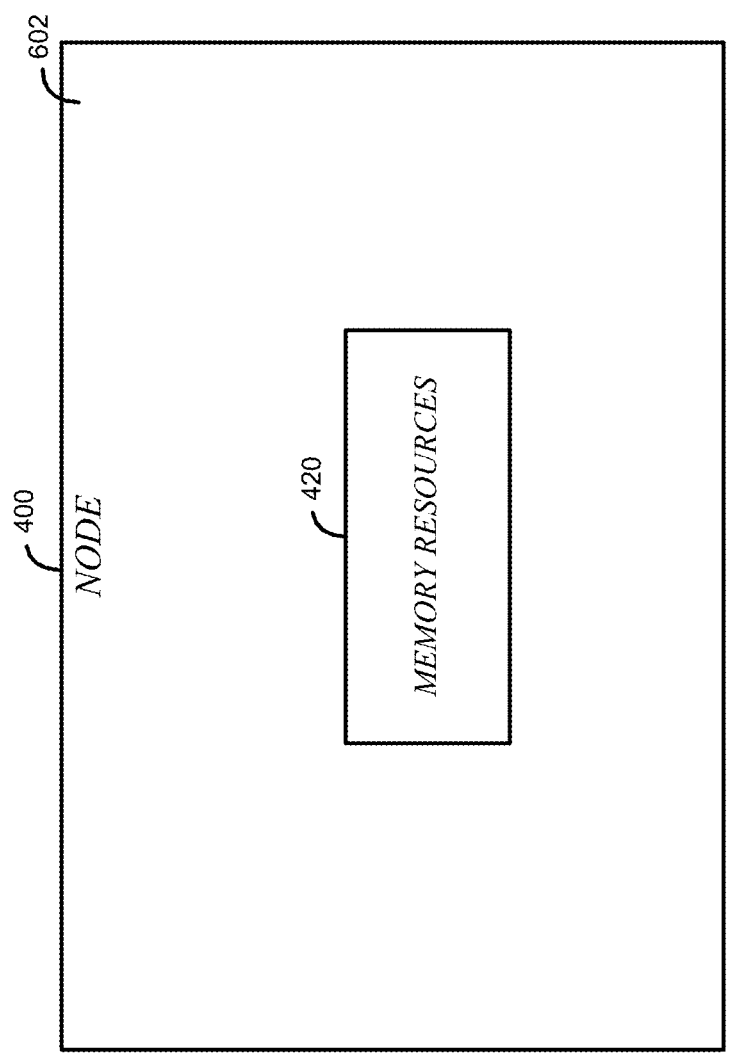
FIG. 4 is a simplified block diagram of at least one embodiment of a bottom side of a node.

Referring now to FIG. 4, in addition to the physical resources 330 mounted on circuit board substrate 302, the node 400 also includes one or more memory devices 420. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420 in some embodiments. Alternatively, in other embodiments, each physical resource 320 may be communicatively coupled to each memory device 420.

The memory devices 420 may be embodied as any type of memory device capable of storing data for the physical resources 320 during operation of the node 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies, for example, multi-threshold level NAND flash memory and NOR flash memory. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices (e.g., memory devices that use chalcogenide glass), multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 5:
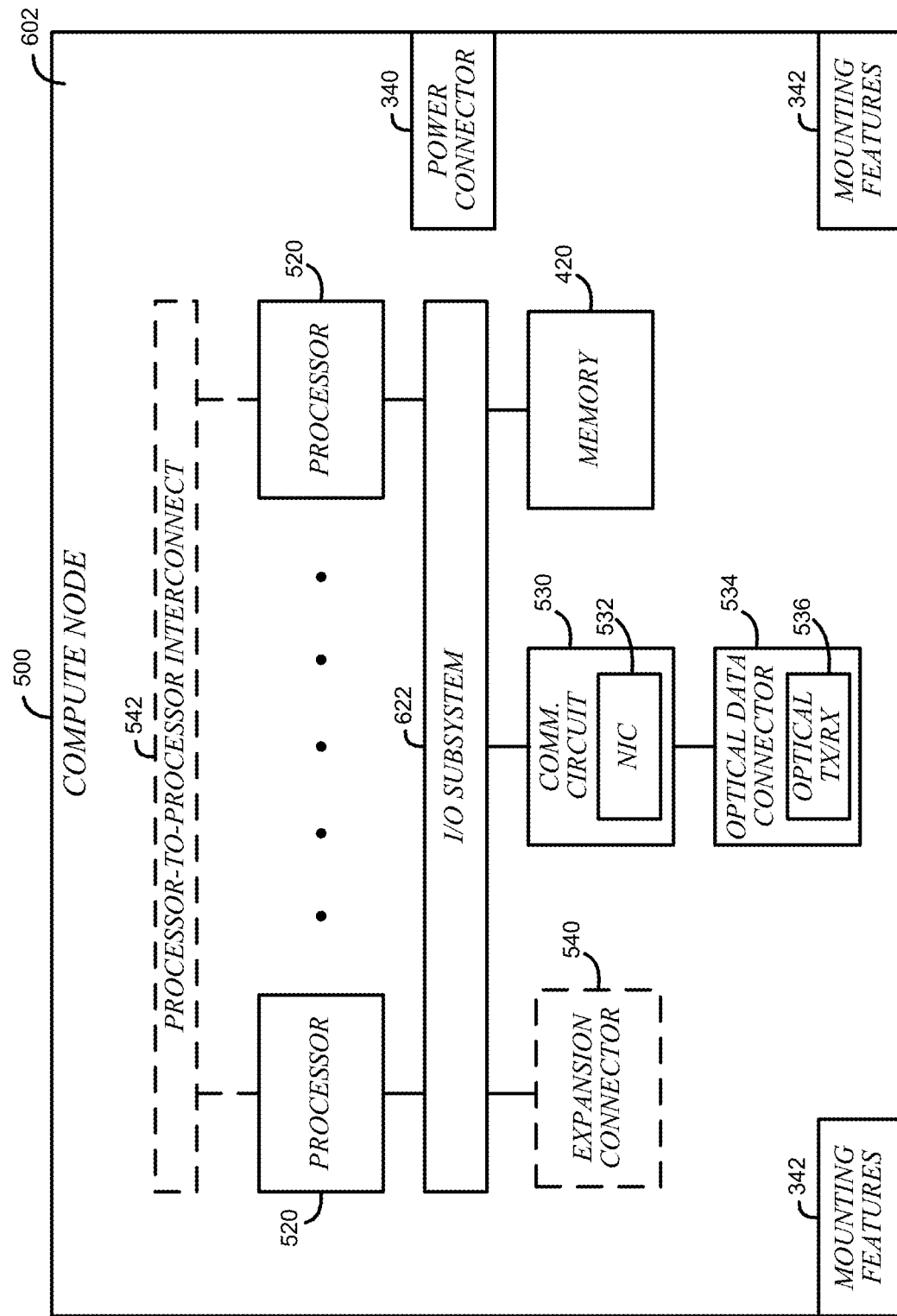
FIG. 5 is a simplified block diagram of at least one embodiment of a compute node.

Referring now to FIG. 5, in some embodiments, the node 400 may be embodied as a compute node 500. The compute node 500 can be configured to perform compute tasks. Of course, as discussed above, the compute node 500 may rely on other nodes, such as acceleration nodes and/or storage nodes, to perform compute tasks. In the illustrative compute node 500, the physical resources 320 are embodied as processors 520. Although only two processors 520 are shown in FIG. 5, it should be appreciated that the compute node 500 may include additional processors 520 in other embodiments. Illustratively, the processors 520 are embodied as high-performance processors 520 and may be configured to operate at a relatively high power rating.

In some embodiments, the compute node 500 may also include a processor-to-processor interconnect 542. Processor-to-processor interconnect 542 may be embodied as any type of communication interconnect capable of facilitating processor-to-processor interconnect 542 communications. In the illustrative embodiment, the processor-to-processor interconnect 542 is embodied as a high-speed point-to-point interconnect (e.g., faster than the I/O subsystem 322). For example, the processor-to-processor interconnect 542 may be embodied as a QuickPath Interconnect (QPI), an Ultra-Path Interconnect (UPI), or other high-speed point-to-point interconnect dedicated to processor-to-processor communications (e.g., PCIe or CXL).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (e.g., with other nodes 400). In some embodiments, the NIC 532 may be embodied as part of a system-on-a-chip (SoC) that includes one or more processors, or included on a multichip package that also contains one or more processors. In some embodiments, the NIC 532 may include a local processor (not shown) and/or a local memory (not shown) that are both local to the NIC 532. In such embodiments, the local processor of the NIC 532 may be capable of performing one or more of the functions of the processors 520. Additionally or alternatively, in such embodiments, the local memory of the NIC 532 may be integrated into one or more components of the compute node at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

Some examples of a NIC are part of an Infrastructure Processing Unit (IPU) or data processing unit (DPU) or utilized by an IPU or DPU. An IPU or DPU can include a network interface, memory devices, and one or more programmable or fixed function processors (e.g., CPU or XPU) to perform offload of operations that could have been performed by a host CPU or XPU or remote CPU or XPU. In some examples, the IPU or DPU can perform virtual switch operations, manage storage transactions (e.g., compression, cryptography, virtualization), and manage operations performed on other IPUs, DPUs, servers, or devices.

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534 in the illustrative embodiment, the optical transceiver 536 may form a portion of the communication circuit 530 in other embodiments.

In some embodiments, the compute node 500 may also include an expansion connector 540. In such embodiments, the expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits. Note that reference to GPU or CPU herein can in addition or alternatively refer to an XPU or xPU. An xPU can include one or more of: a GPU, ASIC, FPGA, or accelerator device.

Figure 6:
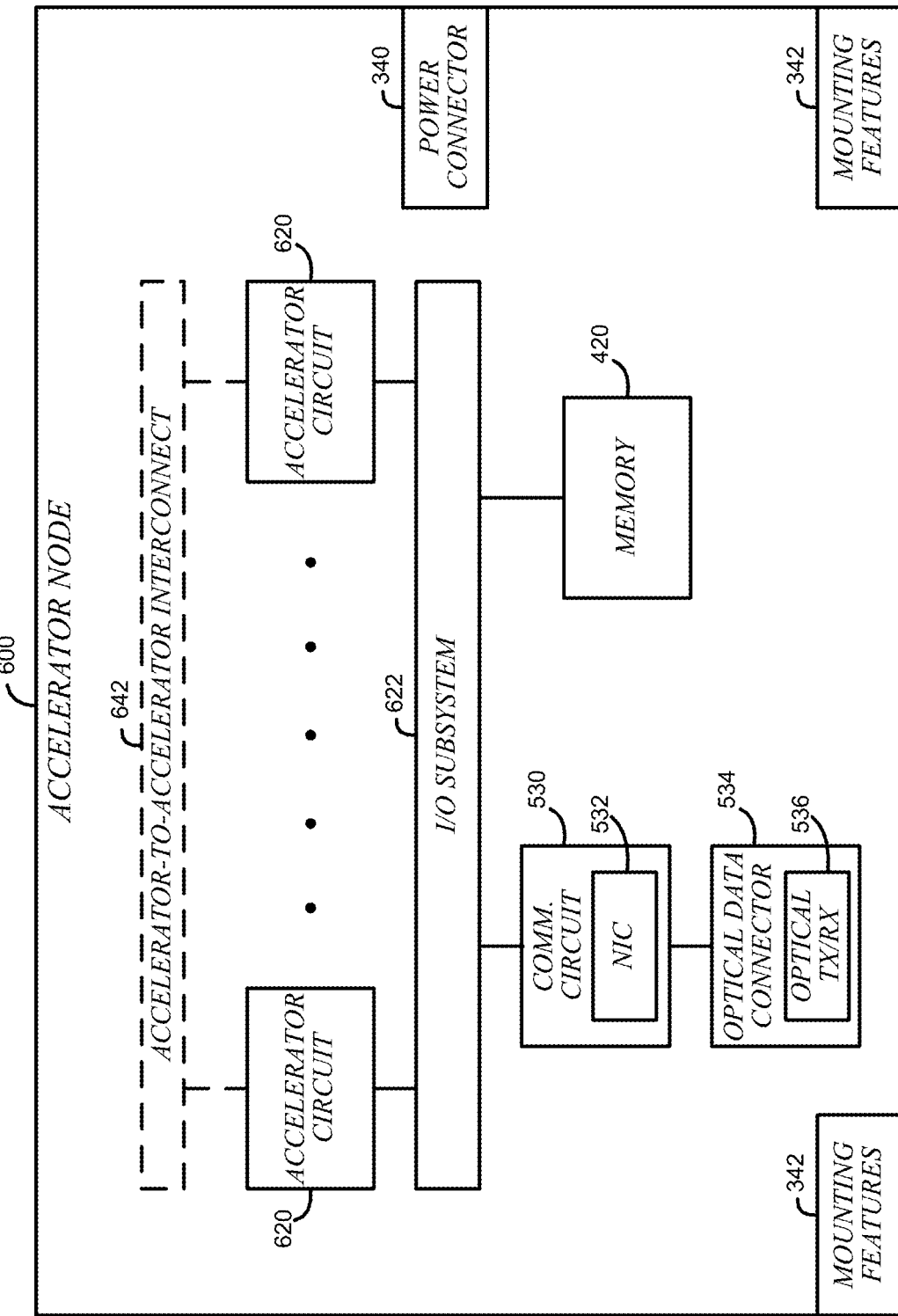
FIG. 6 is a simplified block diagram of at least one embodiment of an accelerator node usable in a data center.

Referring now to FIG. 6, in some embodiments, the node 400 may be embodied as an accelerator node 600. The accelerator node 600 is configured to perform specialized compute tasks, such as machine learning, encryption, hashing, or other computational-intensive task. In some embodiments, for example, a compute node 500 may offload tasks to the accelerator node 600 during operation. The accelerator node 600 includes various components similar to components of the node 400 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620 in other embodiments. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, programmable processing pipeline (e.g., programmable by P4, C, Python, Broadcom Network Programming Language (NPL), or x86 compatible executable binaries or other executable binaries). Processors, FPGAs, other specialized processors, controllers, devices, and/or circuits can be used utilized for packet processing or packet modification. Ternary content-addressable memory (TCAM) can be used for parallel match-action or look-up operations on packet header content.

In some embodiments, the accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. In the illustrative embodiment, the accelerator-to-accelerator interconnect 642 is embodied as a high-speed point-to-point interconnect (e.g., faster than the I/O subsystem 322). For example, the accelerator-to-accelerator interconnect 642 may be embodied as a QuickPath Interconnect (QPI), an UltraPath Interconnect (UPI), or other high-speed point-to-point interconnect dedicated to processor-to-processor communications. In some embodiments, the accelerator circuits 620 may be daisy-chained with a primary accelerator circuit 620 connected to the NIC 532 and memory 420 through the I/O subsystem 322 and a secondary accelerator circuit 620 connected to the NIC 532 and memory 420 through a primary accelerator circuit 620.

Figure 7:
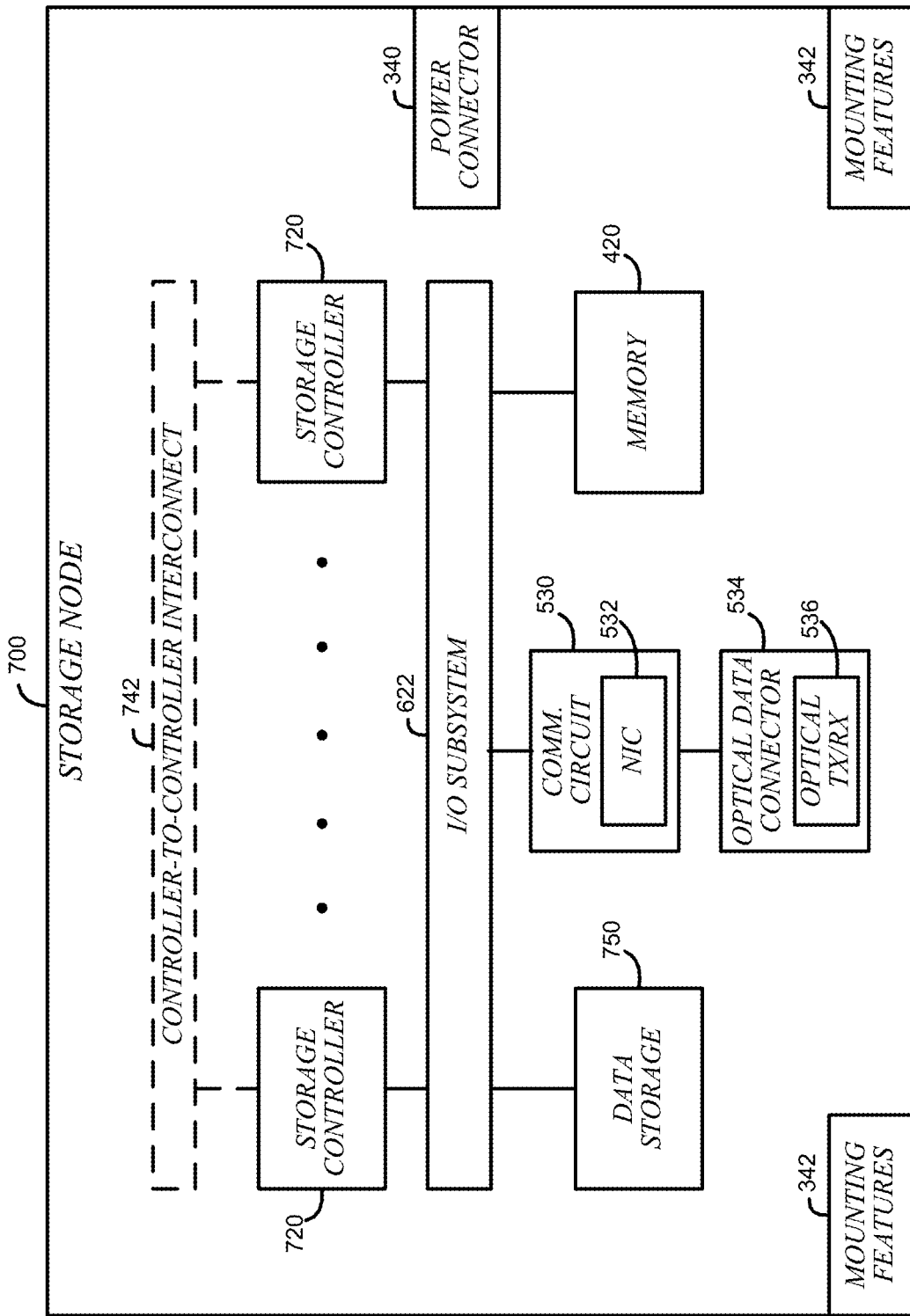
FIG. 7 is a simplified block diagram of at least one embodiment of a storage node usable in a data center.

Referring now to FIG. 7, in some embodiments, the node 400 may be embodied as a storage node 700. The storage node 700 is configured, to store data in a data storage 750 local to the storage node 700. For example, during operation, a compute node 500 or an accelerator node 600 may store and retrieve data from the data storage 750 of the storage node 700. The storage node 700 includes various components similar to components of the node 400 and/or the compute node 500, which have been identified in FIG. 7 using the same reference numbers.

In the illustrative storage node 700, the physical resources 320 are embodied as storage controllers 720. Although only two storage controllers 720 are shown in FIG. 7, it should be appreciated that the storage node 700 may include additional storage controllers 720 in other embodiments. The storage controllers 720 may be embodied as any type of processor, controller, or control circuit capable of controlling the storage and retrieval of data into the data storage 750 based on requests received via the communication circuit 530. In the illustrative embodiment, the storage controllers 720 are embodied as relatively low-power processors or controllers.

In some embodiments, the storage node 700 may also include a controller-to-controller interconnect 742. Similar to the resource-to-resource interconnect 324 of the node 400 discussed above, the controller-to-controller interconnect 742 may be embodied as any type of communication interconnect capable of facilitating controller-to-controller communications. In the illustrative embodiment, the controller-to-controller interconnect 742 is embodied as a high-speed point-to-point interconnect (e.g., faster than the I/O subsystem 322). For example, the controller-to-controller interconnect 742 may be embodied as a QuickPath Interconnect (QPI), an UltraPath Interconnect (UPI), or other high-speed point-to-point interconnect dedicated to processor-to-processor communications.

Figure 8:
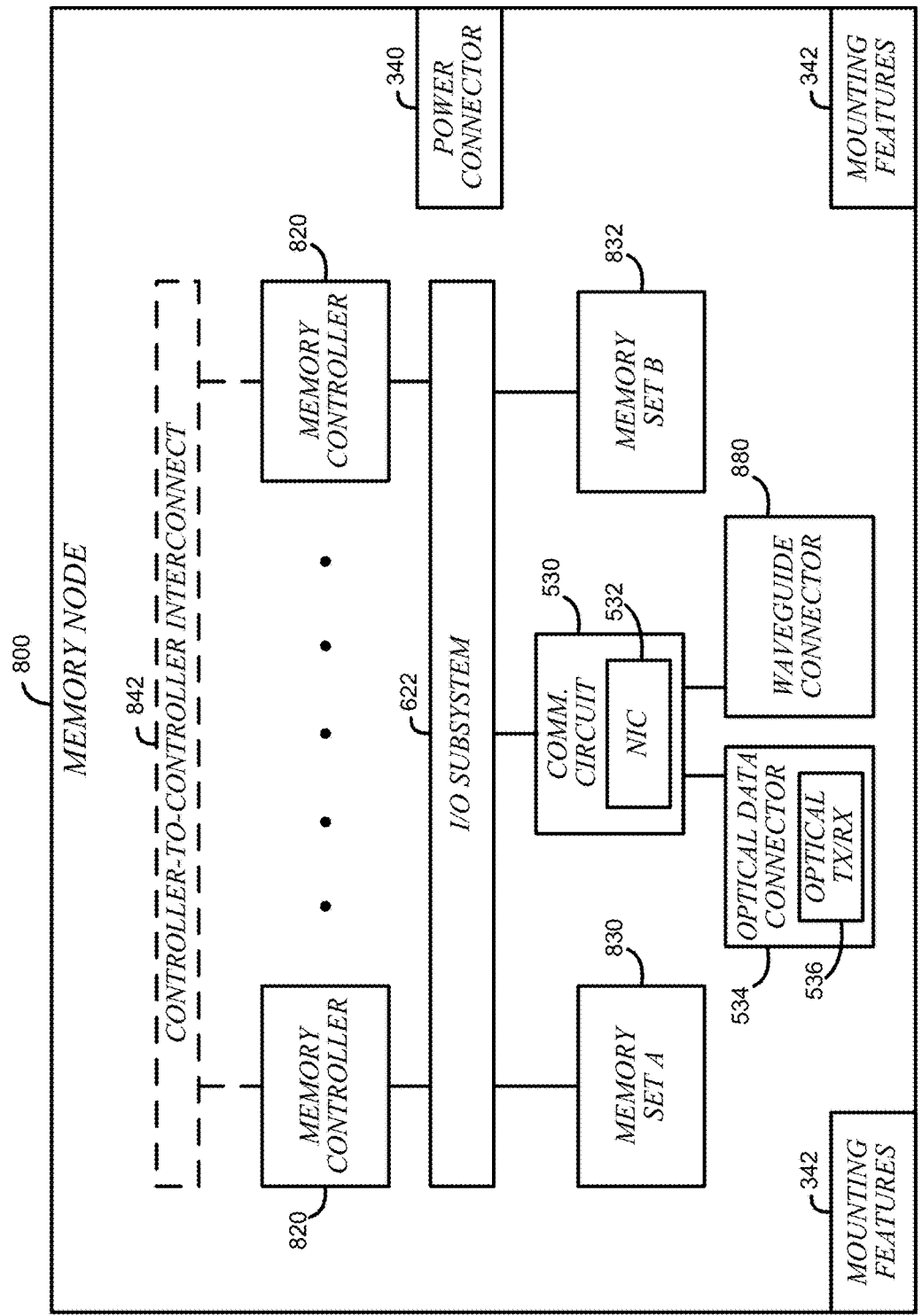
FIG. 8 is a simplified block diagram of at least one embodiment of a memory node usable in a data center.

Referring now to FIG. 8, in some embodiments, the node 400 may be embodied as a memory node 800. The memory node 800 is configured to provide other nodes 400 (e.g., compute nodes 500, accelerator nodes 600, etc.) with access to a pool of memory (e.g., in two or more sets 830, 832 of memory devices 420) local to the storage node 700. For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820 in other embodiments. The memory controllers 820 may be embodied as any type of processor, controller, or control circuit capable of controlling the writing and reading of data into the memory sets 830, 832 based on requests received via the communication circuit 530. In the illustrative embodiment, each memory controller 820 is connected to a corresponding memory set 830, 832 to write to and read from memory devices 420 within the corresponding memory set 830, 832 and enforce a permissions (e.g., read, write, etc.) associated with node 400 that has sent a request to the memory node 800 to perform a memory access operation (e.g., read or write).

In some embodiments, the memory node 800 may also include a controller-to-controller interconnect 842. Similar to the resource-to-resource interconnect 324 of the node 400 discussed above, the controller-to-controller interconnect 842 may be embodied as any type of communication interconnect capable of facilitating controller-to-controller communications. In the illustrative embodiment, the controller-to-controller interconnect 842 is embodied as a high-speed point-to-point interconnect (e.g., faster than the I/O subsystem 322). For example, the controller-to-controller interconnect 842 may be embodied as a QuickPath Interconnect (QPI), an UltraPath Interconnect (UPI), or other high-speed point-to-point interconnect dedicated to processor-to-processor communications. As such, in some embodiments, a memory controller 820 may access, through the controller-to-controller interconnect 842, memory that is within the memory set 832 associated with another memory controller 820. In some embodiments, a scalable memory controller is made of multiple smaller memory controllers, referred to herein as "chiplets", on a memory node (e.g., the memory node 800). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 820 may implement a memory interleave (e.g., one memory address is mapped to the memory set 830, the next memory address is mapped to the memory set 832, and the third address is mapped to the memory set 830, etc.). The interleaving may be managed within the memory controllers 820, or from CPU sockets (e.g., of the compute node 500) across network links to the memory sets 830, 832, and may improve the latency associated with performing memory access operations as compared to accessing contiguous memory addresses from the same memory device.

Further, in some embodiments, the memory node 800 may be connected to one or more other nodes 400 (e.g., in the same rack 240 or an adjacent rack 240) through a waveguide, using the waveguide connector 880. Using a waveguide may provide high throughput access to the memory pool (e.g., the memory sets 830, 832) to another node (e.g., a node 400 in the same rack 240 or an adjacent rack 240 as the memory node 800) without adding to the load on the optical data connector 534.

Figure 9:
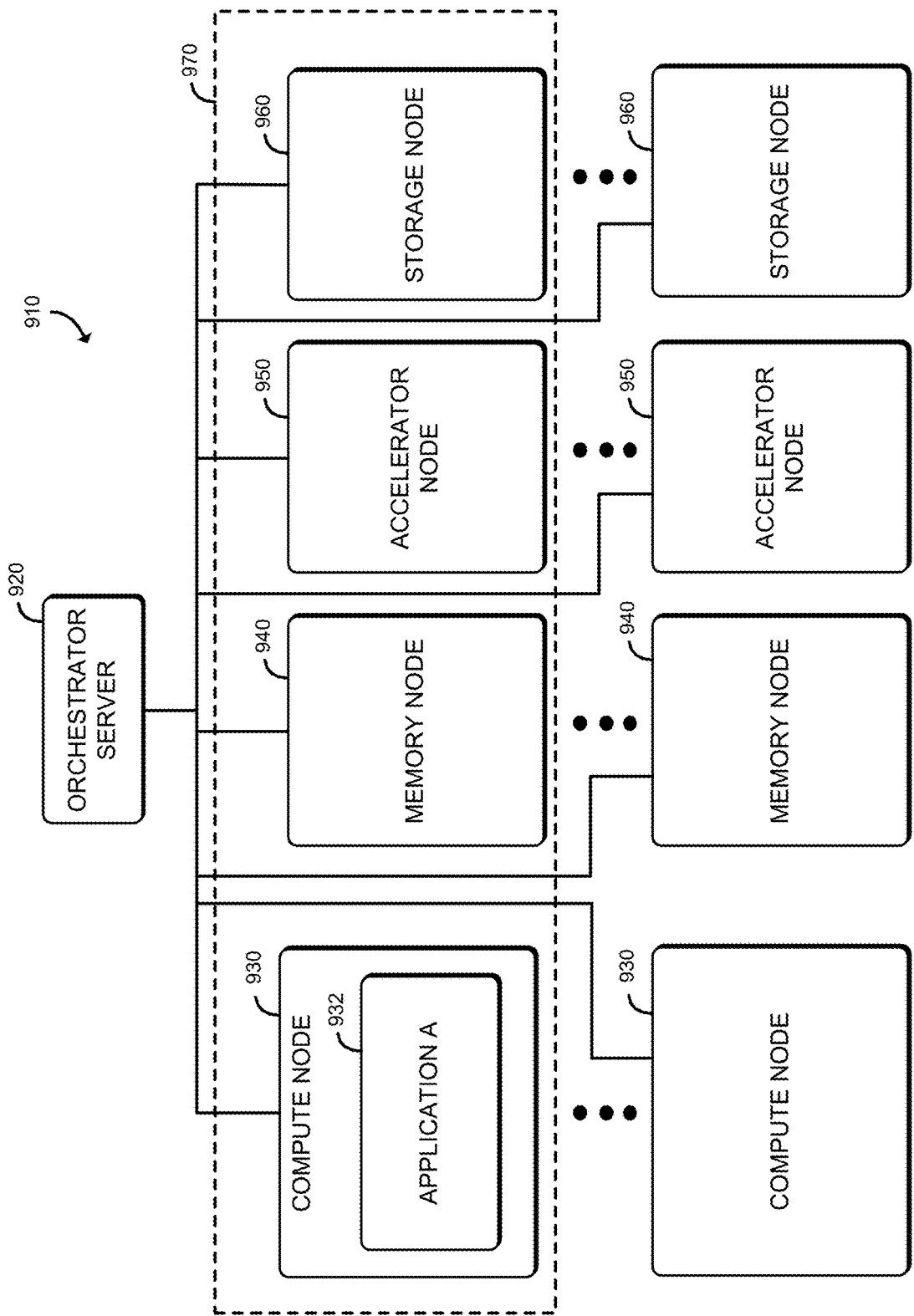
FIG. 9 depicts a system for executing one or more workloads.

Referring now to FIG. 9, a system for executing one or more workloads (e.g., applications) may be implemented. In the illustrative embodiment, the system 910 includes an orchestrator server 920, which may be embodied as a managed node comprising a compute device (e.g., a processor 520 on a compute node 500) executing management software (e.g., a cloud operating environment, such as OpenStack) that is communicatively coupled to multiple nodes 400 including a large number of compute nodes 930 (e.g., each similar to the compute node 500), memory nodes 940 (e.g., each similar to the memory node 800), accelerator nodes 950 (e.g., each similar to the memory node 600), and storage nodes 960 (e.g., each similar to the storage node 700). One or more of the nodes 930, 940, 950, 960 may be grouped into a managed node 970, such as by the orchestrator server 920, to collectively perform a workload (e.g., an application 932 executed in a virtual machine or in a container).

The managed node 970 may be embodied as an assembly of physical resources 320, such as processors 520, memory resources 420, accelerator circuits 620, or data storage 750, from the same or different nodes 400. Further, the managed node may be established, defined, or "spun up" by the orchestrator server 920 at the time a workload is to be assigned to the managed node or at a time, and may exist regardless of whether a workload is presently assigned to the managed node. In the illustrative embodiment, the orchestrator server 920 may selectively allocate and/or deallocate physical resources 320 from the nodes 400 and/or add or remove one or more nodes 400 from the managed node 970 as a function of quality of service (QOS) targets (e.g., a target throughput, a target latency, a target number instructions per second, etc.) associated with a service level agreement or class of service (COS or CLOS) for the workload (e.g., the application 932). In doing so, the orchestrator server 920 may receive telemetry data indicative of performance conditions (e.g., throughput, latency, instructions per second, etc.) in each node 400 of the managed node 970 and compare the telemetry data to the quality of service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (e.g., to execute a different workload). Alternatively, if the QoS targets are not presently satisfied, the orchestrator server 920 may determine to dynamically allocate additional physical resources to assist in the execution of the workload (e.g., the application 932) while the workload is executing. Similarly, the orchestrator server 920 may determine to dynamically deallocate physical resources from a managed node if the orchestrator server 920 determines that deallocating the physical resource would result in QoS targets still being met.

Additionally, in some embodiments, the orchestrator server 920 may identify trends in the resource utilization of the workload (e.g., the application 932), such as by identifying phases of execution (e.g., time periods in which different operations, each having different resource utilizations characteristics, are performed) of the workload (e.g., the application 932) and pre-emptively identifying available resources in the data center and allocating them to the managed node 970 (e.g., within a predefined time period of the associated phase beginning). In some embodiments, the orchestrator server 920 may model performance based on various latencies and a distribution scheme to place workloads among compute nodes and other resources (e.g., accelerator nodes, memory nodes, storage nodes) in the data center. For example, the orchestrator server 920 may utilize a model that accounts for the performance of resources on the nodes 400 (e.g., FPGA performance, memory access latency, etc.) and the performance (e.g., congestion, latency, bandwidth) of the path through the network to the resource (e.g., FPGA). As such, the orchestrator server 920 may determine which resource(s) should be used with which workloads based on the total latency associated with each potential resource available in the data center 100 (e.g., the latency associated with the performance of the resource itself in addition to the latency associated with the path through the network between the compute node executing the workload and the node 400 on which the resource is located).

In some embodiments, the orchestrator server 920 may generate a map of heat generation in the data center 100 using telemetry data (e.g., temperatures, fan speeds, etc.) reported from the nodes 400 and allocate resources to managed nodes as a function of the map of heat generation and predicted heat generation associated with different workloads, to maintain a target temperature and heat distribution in the data center 100. Additionally or alternatively, in some embodiments, the orchestrator server 920 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 920 may identify patterns in resource utilization phases of the workloads and use the patterns to predict future resource utilization of the workloads.

To reduce the computational load on the orchestrator server 920 and the data transfer load on the network, in some embodiments, the orchestrator server 920 may send self-test information to the nodes 400 to enable each node 400 to locally (e.g., on the node 400) determine whether telemetry data generated by the node 400 satisfies one or more conditions (e.g., an available capacity that satisfies a predefined threshold, a temperature that satisfies a predefined threshold, etc.). Each node 400 may then report back a simplified result (e.g., yes or no) to the orchestrator server 920, which the orchestrator server 920 may utilize in determining the allocation of resources to managed nodes.

Embodiments described herein can be used in a data center or disaggregated composite nodes. The techniques described herein can apply to both disaggregated and traditional server architectures. A traditional server can include a CPU, XPU, one or more memory devices, networking communicatively coupled to one or more circuit boards within a server.

Edge Network

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high performance compute data center or cloud installation; a designated edge node server, an enterprise server, a roadside server, a telecom central office; or a local or peer at-the-edge device being served consuming edge services).

With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or monetary or resource cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency user-cases such as autonomous driving, video surveillance, and mobile media consumption. Additionally, these resources will benefit from service management in an edge system which provides the ability to scale and achieve local service level agreements (SLAs) or service level objectives (SLOs), manage tiered service requirements, and enable local features and functions on a temporary or permanent basis.

A pool can include a device on a same chassis or different physically dispersed devices on different chassis or different racks. A resource pool can include homogeneous processors, homogeneous processors, and/or a memory pool.

An illustrative edge computing system may support and/or provide various services to endpoint devices (e.g., client user equipment (UEs)), each of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

Figure 10:
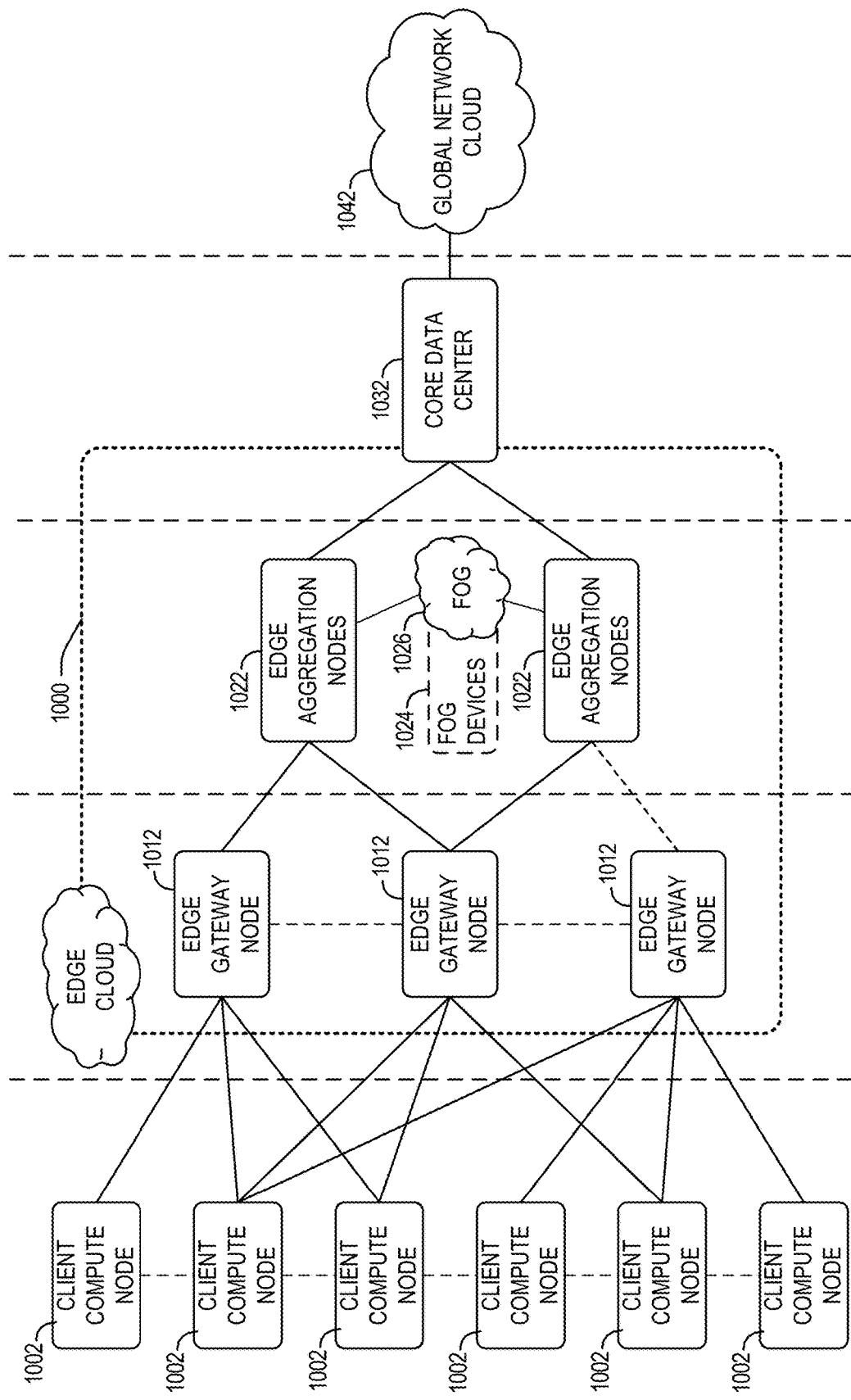
FIG. 10 depicts an example system.

FIG. 10 generically depicts an edge computing system 1000 for providing edge services and applications to multi-stakeholder entities, as distributed among one or more client compute nodes 1002, one or more edge gateway nodes 1012, one or more edge aggregation nodes 1022, one or more core data centers 1032, and a global network cloud 1042, as distributed across layers of the network. The implementation of the edge computing system 1000 may be provided at or on behalf of a telecommunication service provider ("telco", or "TSP"), internet-of-things service provider, cloud service provider (CSP), enterprise entity, or any other number of entities. Various implementations and configurations of the system 1000 may be provided dynamically, such as when orchestrated to meet service objectives.

For example, the client compute nodes 1002 are located at an endpoint layer, while the edge gateway nodes 1012 are located at an edge devices layer (local level) of the edge computing system 1000. Additionally, the edge aggregation nodes 1022 (and/or fog devices 1024, if arranged or operated with or among a fog networking configuration 1026) are located at a network access layer (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement. Fog computing in many scenarios provide a decentralized architecture and serves as an extension to cloud computing by collaborating with one or more edge node devices, providing the subsequent amount of localized control, configuration and management, and much more for end devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 1032 is located at a core network layer (a regional or geographically-central level), while the global network cloud 1042 is located at a cloud data center layer (a national or world-wide layer). The use of "core" is provided as a term for a centralized network location-deeper in the network-which is accessible by multiple edge nodes or components; however, a "core" does not necessarily designate the "center" or the deepest location of the network. Accordingly, the core data center 1032 may be located within, at, or near the edge cloud 1000. Although an illustrative number of client compute nodes 1002, edge gateway nodes 1012, edge aggregation nodes 1022, edge core data centers 1032, global network clouds 1042 are shown in FIG. 10, it should be appreciated that the edge computing system 1000 may include additional devices or systems at each layer. Devices at a layer can be configured as peer nodes to each other and, accordingly, act in a collaborative manner to meet service objectives.

Consistent with the examples provided herein, a client compute node 1002 may be embodied as any type of endpoint component, device, appliance, or other thing capable of communicating as a producer or consumer of data. Further, the label "node" or "device" as used in the edge computing system 1000 does not necessarily mean that such node or device operates in a client or agent/minion/follower role; rather, one or more of the nodes or devices in the edge computing system 1000 refer to individual entities, nodes, or subsystems which include discrete or connected hardware or software configurations to facilitate or use the edge cloud 1000.

As such, the edge cloud 1000 is formed from network components and functional features operated by and within the edge gateway nodes 1012 and the edge aggregation nodes 1022. The edge cloud 1000 may be embodied as any type of network that provides edge computing and/or storage resources which are proximately located to radio access network (RAN) capable endpoint devices (e.g., mobile computing devices, IoT devices, smart devices, etc.), which are shown in FIG. 10 as the client compute nodes 1002. In other words, the edge cloud 1000 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 1000 may form a portion of or otherwise provide an ingress point into or across a fog networking configuration 1026 (e.g., a network of fog devices 1024, not shown in detail), which may be embodied as a system-level horizontal and distributed architecture that distributes resources and services to perform a specific function. For instance, a coordinated and distributed network of fog devices 1024 may perform computing, storage, control, or networking aspects in the context of an IoT system arrangement. Other networked, aggregated, and distributed functions may exist in the edge cloud 1000 between the core data center 1032 and the client endpoints (e.g., client compute nodes 1002). Some of these are discussed in the following sections in the context of network functions or service virtualization, including the use of virtual edges and virtual services which are orchestrated for multiple stakeholders.

As discussed in more detail below, the edge gateway nodes 1012 and the edge aggregation nodes 1022 cooperate to provide various edge services and security to the client compute nodes 1002. Furthermore, because a client compute node 1002 may be stationary or mobile, a respective edge gateway node 1012 may cooperate with other edge gateway devices to propagate presently provided edge services, relevant service data, and security as the corresponding client compute node 1002 moves about a region. To do so, the edge gateway nodes 1012 and/or edge aggregation nodes 1022 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 1000. In a multi-stakeholder environment, there can be multiple loadable security modules (LSMs) used to provision policies that enforce the stakeholder's interests. Enforcement point environments could support multiple LSMs that apply the combination of loaded LSM policies (e.g., where the most constrained effective policy is applied, such as where if one or more of A, B or C stakeholders restricts access then access is restricted). Within the edge cloud 1000, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

Figure 11:
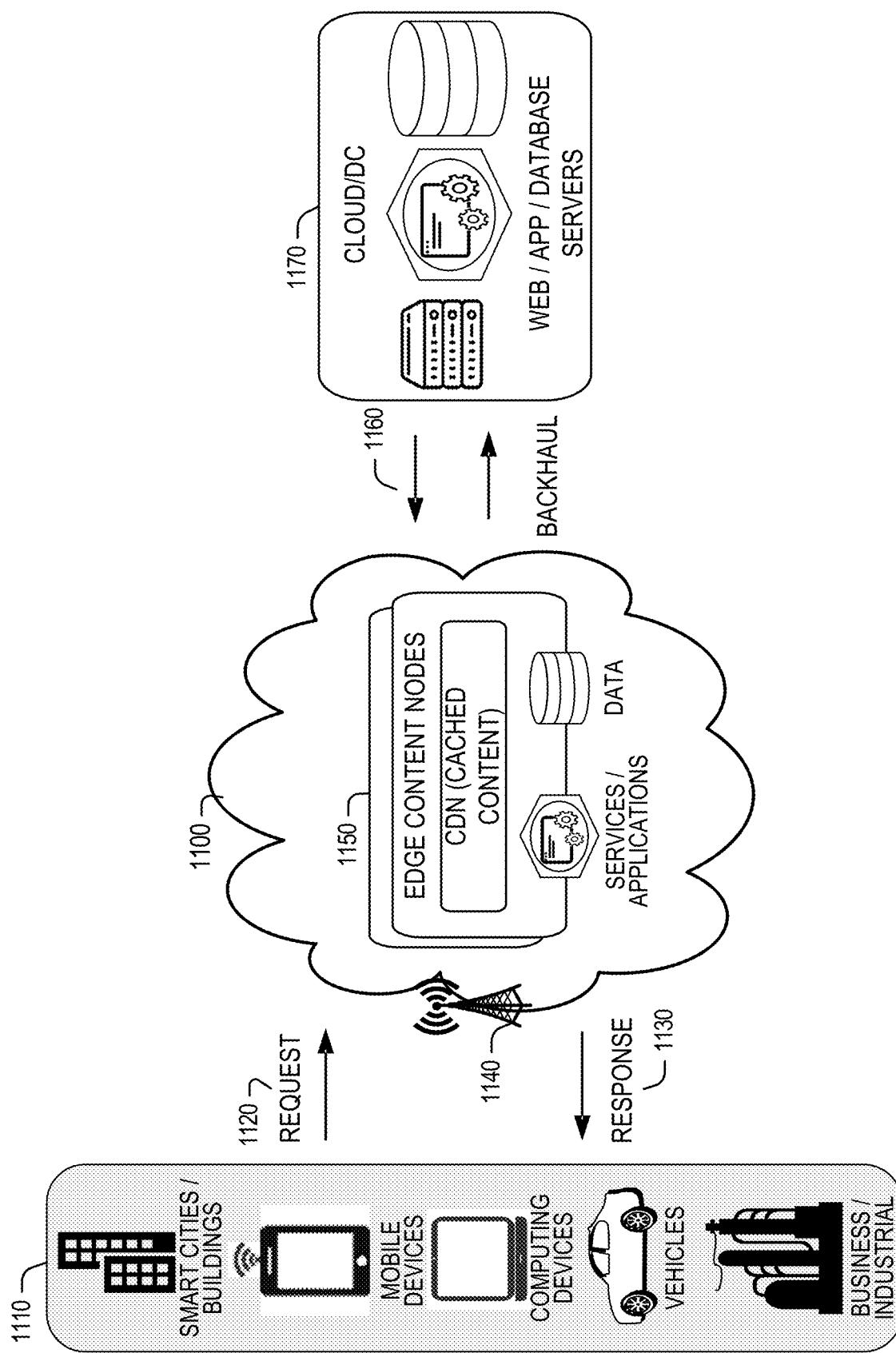
FIG. 11 shows an example system.

FIG. 11 shows an example where various client endpoints 1110 (in the form of mobile devices, computers, autonomous vehicles, business computing equipment, industrial processing equipment) provide requests 1120 for services or data transactions, and receive responses 1130 for the services or data transactions, to and from the edge cloud 1100 (e.g., via a wireless or wired network 1140). Within the edge cloud 1000, the CSP may deploy various compute and storage resources, such as edge content nodes 1150 to provide cached content from a distributed content delivery network. Other available compute and storage resources available on the edge content nodes 1150 may be used to execute other services and fulfill other workloads. The edge content nodes 1150 and other systems of the edge cloud 1000 are connected to a cloud or data center 1170, which uses a backhaul network 1160 to fulfill higher-latency requests from a cloud/data center for websites, applications, database servers, etc.

Various embodiments can be used in any example of FIGS. 1-11 to allocate, configure, and/or provide packet processing resources of one or more network devices at least to provide a service mesh and reliable transport of packets between network devices.

Network Processing Resource Configuration and Allocation

Figure 12:
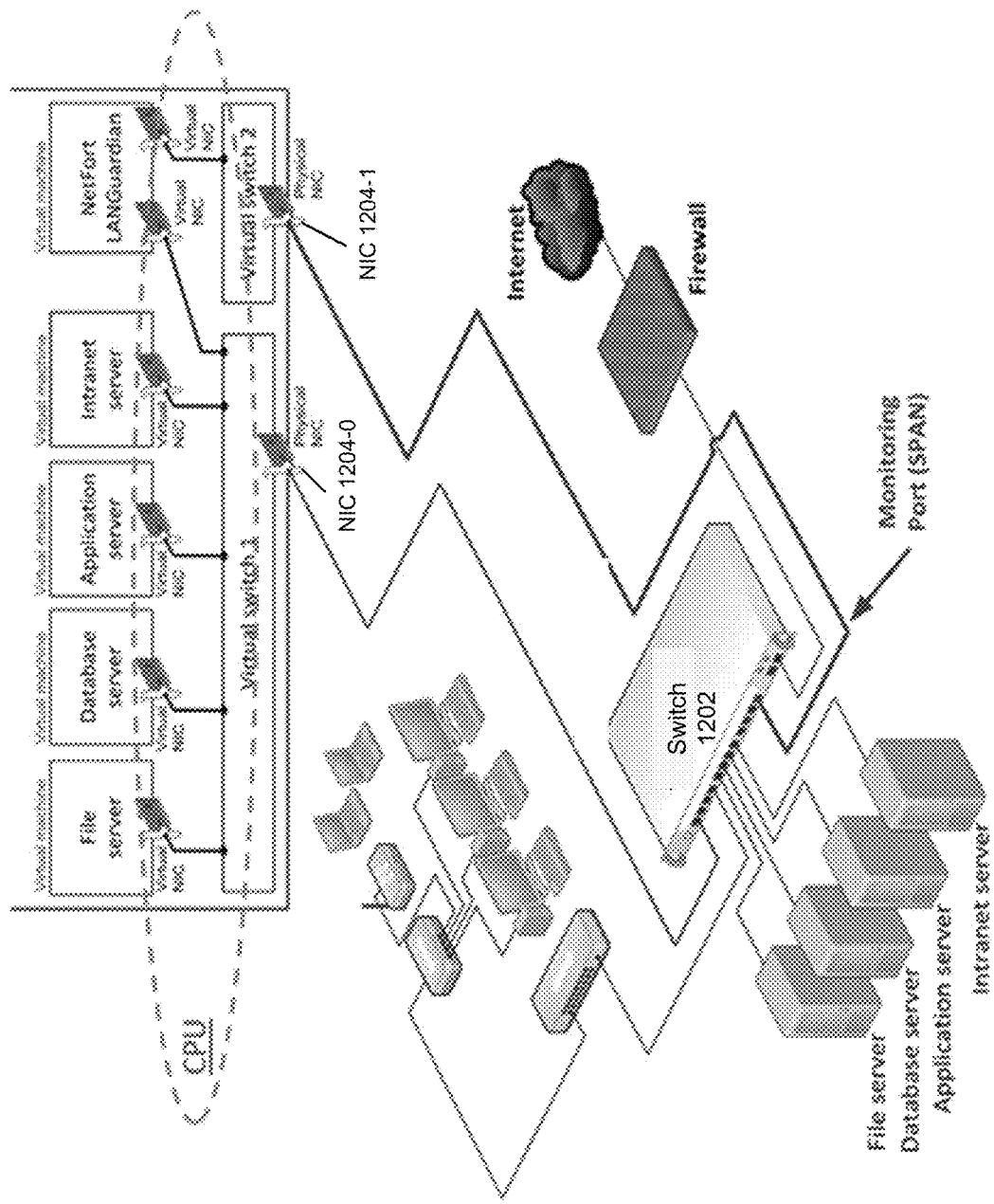
FIG. 12 depicts an example of a Switch Centered Cloud Infrastructure (SCCI) that utilizes a switch to manage operations in a cloud infrastructure.

FIG. 12 depicts an example of a Switch Centered Cloud Infrastructure (SCCI) that utilizes a switch to manage operations in a cloud infrastructure. For an SCCI, some of the data plane can be performed in switch 1202 and network interface cards (NIC) 1204-0 and 1204-1. A control plane or control agent can be executed by a processor inside switch 1202.

SCCI can involve programming an infrastructure's data plane by P4 language in switch 1202, partially in NIC 1204-0 and/or 1204-1 or a CPU for host-internal traffic. Data plane operations can include operations such as, but not limited to, packet classification, packet modification, packet forwarding, as well as traffic policy (e.g., routing policies to apply in the event of congestion or non-congestion), load balancing (LB), Inband Network Telemetry (INT), and so forth. An infrastructure's control agent can connect a controller in other dedicated servers or a control plane can be implemented inside switch 1202 and outside of a host (e.g., computing server) or smart NIC.

The SCCI architecture of FIG. 12 can be applied to different software frameworks for different use scenarios, which may use different protocols (e.g., non-volatile memory express over fabrics (NVMe-oF)). In some examples, packet protocols can be processed by protocol engines of network devices (e.g., switch 1202, NIC 1204-0, and/or NIC 1204-1).

Various embodiments provide a switch and one or more network interface controllers to perform end-to-end service mesh hardware offloading. Various embodiments provide service mesh data plane features such as proxy in a switch and one or more NICs, microservice load balancing in the switch, protocol encapsulation/decapsulation in NICs, and so forth. Various embodiments leverage reliable transport for communications between microservices at least to transport messages (e.g., remote procedure call (RPC)) between microservices. A NIC's programmable data plane or switch's programmable data plane can be configured to perform one or more of: protocol encapsulation/decapsulation, encryption/decryption, perform rate limiting, telemetry gathering and dissemination, and other functions. Various embodiments deploy a gateway in the service mesh edge to convert protocols (e.g., Transmission Control Protocol (TCP) or Quick User Datagram Protocol (UDP) Internet Connections (QUIC)) and Uniform Resource Locator (URL) to a protocol used in the service mesh and provide a restricted port-binding to the URL. The mesh edge can perform interoperation with protocols via an ingress/egress gateway. Various embodiments provide a proxy (e.g., Envoy, NGINX, HAProxy, and so forth) executed in a programmable data plane of a NIC or switch. In some examples, a NIC or switch can be programmed using P4, Broadcom Network Programming Language (NPL), or other programming languages to perform packet clarification, modification, forwarding as well as traffic policy (e.g., routing and forwarding), Load Balancer (LB), Inband Network Telemetry (INT), and so forth. In some examples, load balancing and traffic policy could be based on transport layer (e.g., L4) and not involve parsing L7 protocol content.

In some embodiments, a service mesh control agent can execute in a top of rack (ToR) switch or server attached thereto to control a packet processing pipeline in the switch and one or more packet processing pipeline in one or more NICs connected to the switch. A ToR switch can be connected to a rack of servers via NICs.

Various embodiments provides a CPU in a gateway, NIC accessed by in one or more servers and smart switch, or an infrastructure processing unit (IPU) to implement offloaded features of a service mesh infrastructure. In some examples, a programmable data plane of a switch and a programmable data plane of a NIC can implement Envoy Proxy, control plane Istio, and a reliable transport protocol. In other embodiments, other switch and NIC implementations of service mesh control and data plane implementation could be utilized.

Figure 13A:
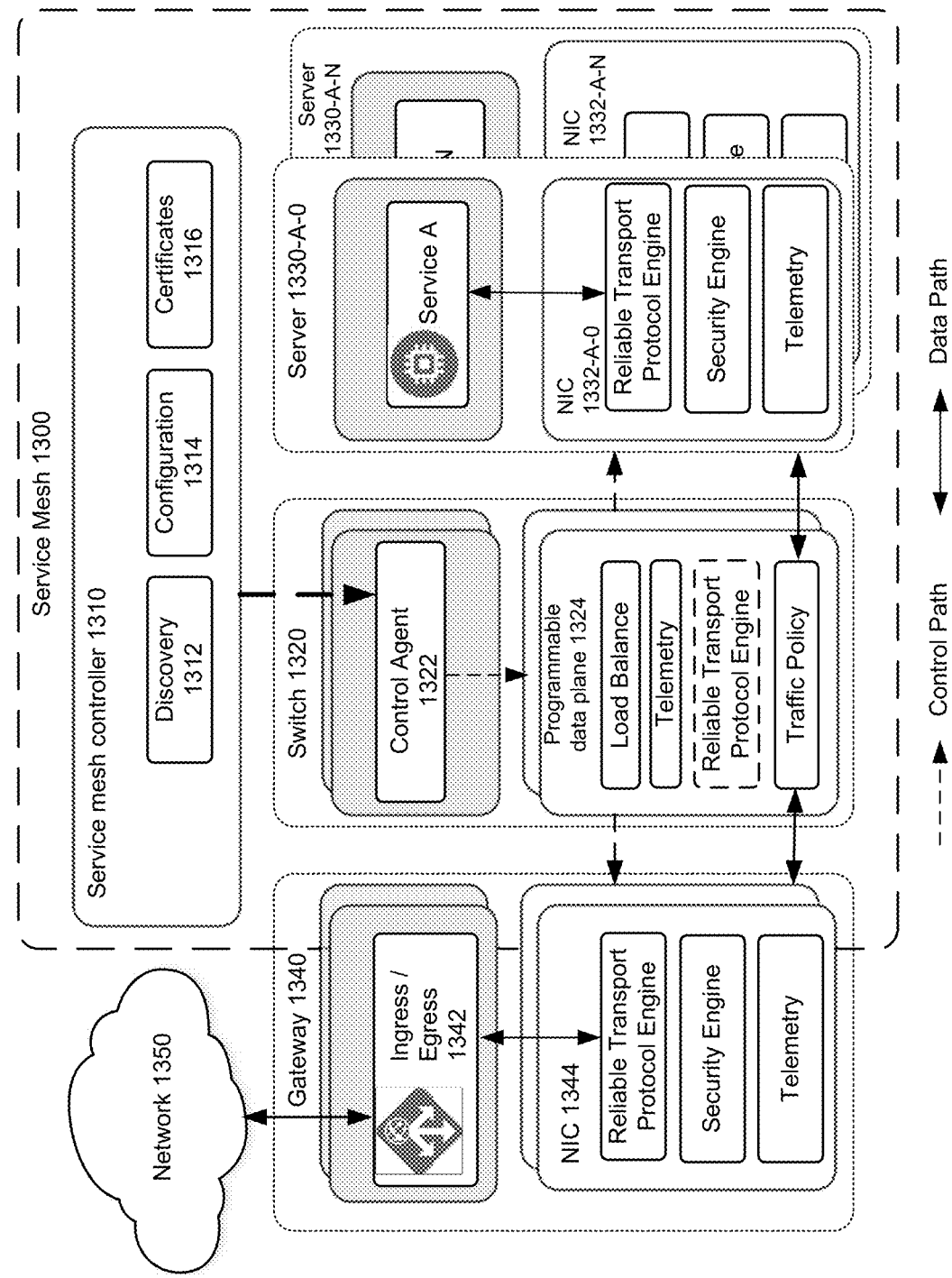
FIG. 13A depicts an example system level topology overview.

FIG. 13A depicts an example system level topology overview. In some examples, service mesh controller 1310 can execute on a server (or other computing platform) and configure switch 1320 and/or gateway 1340. In some examples, switch 1320 can configure one or more of NICs 1330-A to 1330-N and NIC 1344 to route traffic between servers that execute services associated with a service mesh. Service mesh controller 1310 can configure rules of proxy for forwarding traffic inside service mesh 1300.

In some examples, service mesh controller 1310 can execute a subset of features of Istio (e.g., version 1.9 or earlier versions, later versions, or variations thereof) to configure control agent 1332 executing on a processor and/or in a data plane of switch 1320. For example, control agent 1332 can perform a subset of features of Envoy (e.g., version 1.17 or earlier versions, later versions, or variations thereof). In some examples, Istio can configure Envoy using proprietary or standardized packets or other communications.

In some examples, operations of service mesh data plane features such as Envoy proxy, can be divided among switch 1320, gateway NIC 1344, and server NICs 1330-A-0 to 1330-A-N (where N is an integer). For example, switch 1320 can perform load balance and routing whereas NIC (e.g., one or more of gateway NIC 1344 and/or server NICs 1330-A-0 to 1330-N-0) can perform one or more of: packet encapsulation/decapsulation, encryption/decryption, or telemetry monitoring and reporting. In some examples, one or more of switch 1320, gateway NIC 1344, and server NICs 1330-A-0 to 1330-A-N can support a strict subset of Envoy operations (e.g., less than all available Envoy operations) such as one or more of: no ingress/egress function supported; one service-to-one port binding; implementation of a reliable transport protocol; telemetry reporting; or a traffic policy to determine a path of packets between servers or network devices that execute microservices.

Various examples of in-network telemetry reporting are described in: Internet Engineering Task Force (IETF) draft-kumar-ippm-ifa-01, "Inband Flow Analyzer" (February 2019); "In-band Network Telemetry (INT) Dataplane Specification, v2.0," P4.org Applications Working Group (February 2020); IETF draft-lapukhov-dataplane-probe-01, "Dataplane probe for in-band telemetry collection" (2016); and IETF draft-ietf-ippm-ioam-data-09, "In-situ Operations, Administration, and Maintenance (IOAM)" (Mar. 8, 2020). In-situ Operations, Administration, and Maintenance (IOAM) records operational and telemetry information in the packet while the packet traverses a path between two points in the network. IOAM discusses the data fields and associated data types for in-situ OAM. In-situ OAM data fields can be encapsulated into a variety of protocols such as NSH, Segment Routing, Geneve, IPv6 (via extension header), or IPv4. In some examples, control agent 1322 can execute in switch 1320 or a server and control agent 1322 can be configured by service mesh controller 1310. In some examples, control agent 1322 can configure switch 1320 to perform a proxy for forwarding traffic between microservices inside service mesh 1300 as well as traffic policy, load balance, telemetry and security, etc. In some examples, control agent 1322 can configure switch 1320 to execute a Ceph Reliable Autonomic Distributed Object Store (RADOS) block device (RBD) or object storage daemon (OSD) or other proxies for microservice-to-microservice communications. In some examples, control agent 1322 can configure switch 1320 to perform some features of Envoy in programmable data plane 1324 and control agent 1322 can utilize an Envoy API to communicate with service mesh controller 1310.

In some examples, control agent 1322 can configure data plane 1324 of switch 1320 to perform load balancing and traffic policing. Some embodiments of programmable data plane 1324 of switch 1320 may manage traffic by a traffic policy to route traffic to a destination server using a low latency path and load balancing. In some examples, control agent 1322 can configure programmable data plane 1324 to generate and propagate telemetry to other network devices (e.g., one or more of gateway NIC 1344 and server NICs 1330-A-0 to 1330-A-N). Telemetry information can include congestion information and queue depth and can be used to indicate which network paths experience latency for use to select a low latency path. Switch 1320 can change a path of packets or communications to avoid congested network devices. For example, load balancing can include selecting a processor, device, virtual machine, or container to run a target microservice to satisfy an applicable SLA or SLO.

In some examples, service mesh controller 1310 can configure gateway NIC 1344 directly or via switch 1320 using a control plane via packets and a private or proprietary protocol or a standard protocol. In some examples, switch 1320 can configure one or more of NICs 1332-A-0 to 1332-A-N using a control plane via packets and a private or proprietary protocol or a standard protocol. For example, switch 1320 can configure reliable transport protocol engines in one or more programmable packet pipelines in gateway NIC 1344 and server NICs 1332-A-0 to 1332-A-N.

NIC 1332-A-0 can be accessed by server 1330-A-0 at least to send and receive data or communications between microservice A executed by server 1330-A-0 and a microservice (e.g., another instance of microservice A or a different microservice) executed by the same server or different server via switch 1320. In some examples, a microservice can use an interface (e.g., Address Family of the eXpress Data Path (AF_XDP) socket) to send and receive reliable messages using data packets to other microservices via a NIC. For example, queues of an AF_XDP socket can be used by a sender to track acknowledgement (ACK) receipts. For example, queues of an AF_XDP socket can be used by a receiver to reorder received messages. NIC 1332-A-0 can utilize direct memory access (DMA) to read from or write to a memory allocated to a microservice for packet transmission or data receipt. Similar operations can be performed by NICs 1332-A-1 to 1332-A-N.

AF_XDP is a Linux socket type built upon the Extended Berkeley Packet Filter (eBPF) and eXpress Data Path (XDP) technology. An AF_XDP socket receives and sends packets from an eBPF/XDP-based program attached to the network device (netdev) bypassing Linux kernel's subsystems. AF_XDP sockets may enable the possibility for XDP programs to redirect frames to a memory buffer accessible to a user-space application. An AF_XDP socket (XSK) can be created by a socket( ) syscall. XDP or eXpress Data path can provide an in kernel component that processes received packets by a driver. XDP programs can be written as an eBPF program attached to a driver. Instead of using a user space driver, the user space application can directly read or make changes to network packet data and make decisions on how to handle the packet at an earlier stage with the attached XDP program so that the kernel stack may be bypassed in the data path. For example, an operating system (OS) can separate memory or virtual memory into kernel space and user space to provide memory protection and hardware protection from malicious or errant software behavior. User space can be memory allocated to running applications and some drivers. Processes running under user space may have access to a limited part of memory, whereas the kernel may have access to all of the memory. Kernel space can be memory allocated to the kernel, kernel extensions, some device drivers and the operating system. A kernel can manage applications running in user space. Kernel space can be a location where the code of the kernel is stored and executes within.

Gateway 1340 can provide a bridge between service mesh 1300 in a data center(s) and a network 1350. Ingress/Egress 1342 can provide an entrance and exit from service mesh 1300 and translate communications using reliable transport protocol (e.g. TCP or QUIC) from network 1350 to a reliable transport protocol format used by mesh 1300. For example, Ingress/Egress 1342 and/or a packet processing pipeline of gateway NIC 1344 can associate the outside Uniform Resource Identifier (URI) or URL to a port in a service-to-port binding in service mesh 1300.

In some cases, gateway 1340 can perform load balancing in conjunction with load balancing in switch 1320. For example, gateway 1340 can perform external load balancing for north-south (e.g., into or out of a datacenter) whereas an internal load balancing can be performed by switch 1320 for east-west traffic (e.g., traffic between microservices within a datacenter). Gateway 1340 may be deployed as Ingress/Egress 1342 in gateway node 1340, or in one or more of a compute node as a host application.

Figure 13B:
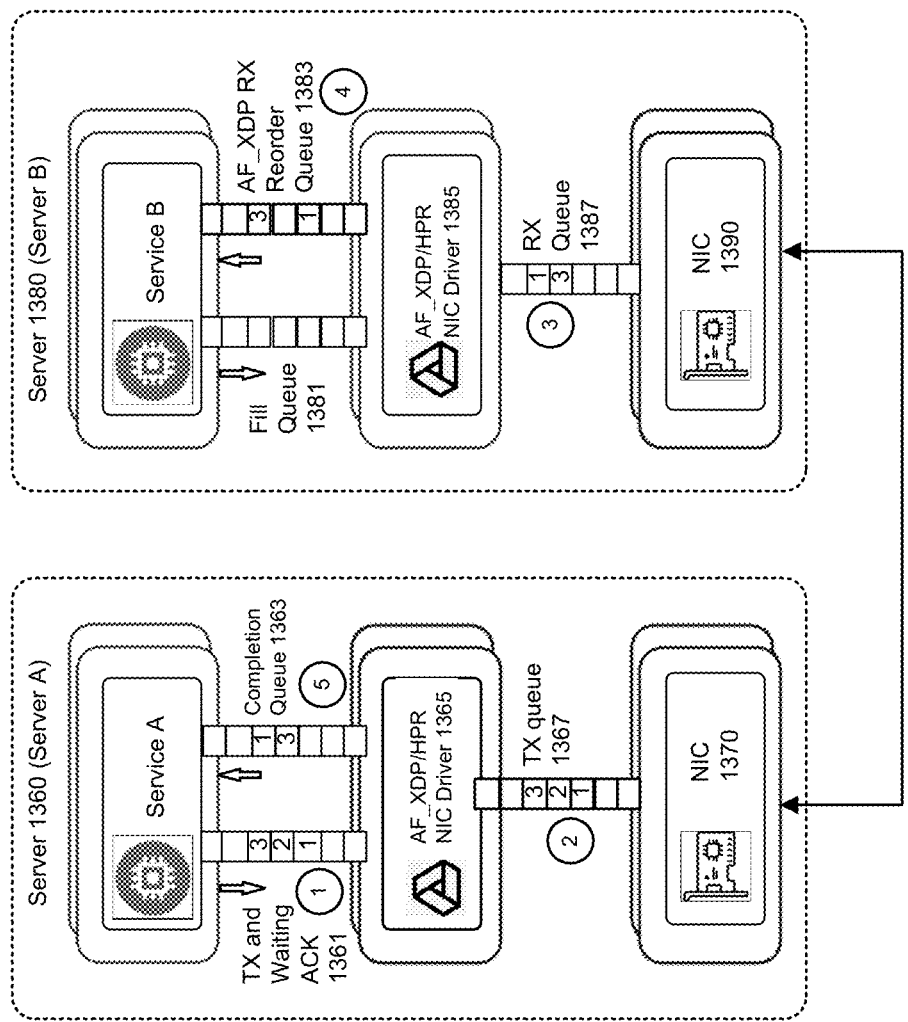
FIGS. 13B and 13C depict an example of reliable transport.

FIG. 13B depicts an example of reliable transport of communications between microservices. The examples depict use of a single AF_XDP socket to transport content of a sub-connection or stream but multiple AF_XDP sockets can be used to transport content of multiple sub-connections or streams. The examples show transmission of packets from server 1360 (Server A) to server 1380 (Server B). For transmission of packets from Server B to Server A, similar technologies can be used by Server B as those used by Server A to transmit packets.

In some examples, server 1360 (server A) sends three packets (packets 1-3) to server 1380 (server B) but packet 2 is not received by server B and server A resends packet 2. For example, service A executing on server A can include a container, virtual machine, application, microservice, or a device. NIC driver 1365 can provide Service A with access to NIC 1370. NIC driver 1365, in some examples, can provide AF_XDP and high performance reliable (HPR) support. AF_XDP can be used for data plane communications whereas HPR can be used for control plane communications. An HPR socket can be used for creating a connection which includes one or more streams, where a stream can include an AF_XDP socket at one or both ends of the communication (e.g., sender and/or receiver).

Service A can utilize an AF_XDP queue to identify a payload in user space for access by NIC 1370. AF_XDP queues can allow for passing payloads to be accessible in user space and kernel space so that a copy from memory accessible to user space to a memory accessible kernel space can be avoided. In other words, a user space buffer in memory can be accessed by posting to a kernel space queue or a kernel space buffer in memory can be accessed by posting to a user space queue. In some examples, a Linux unified/user-space access intended accelerator framework (UACCE) can be used in addition or alternative to AF_XDP. AF_XDP queues can be used to post a message (e.g., descriptor) without copying a message into kernel space for access by a driver. At (1), service A can identify L7 information (e.g., data) by identification of the information (e.g., buffer location) in a descriptor posted to an AF_XDP queue (e.g., TX and waiting ACK queue 1361) in user space but not provide a header (e.g., TCP or IP header).

In some examples, a Connection ID (e.g., UDP transmit port and destination IP address) has associated header fields in kernel space. Packet header fields for payloads can be selected in kernel space by a protocol processing stack or driver 1365 based on a particular connection identifier. Header fields can be associated with an AF_XDP queue and the header fields to be added to a packet header can be based on what AF_XDP queue transfers a packet payload. In some examples, AF_XDP/HPR driver 1365 can update a packet sequence number in a descriptor for a payload based on an AF_XDP queue used to transfer a TX descriptor for the payload. Various examples of descriptor content, including header fields, that can be provided by driver 1365 to NIC 1370 are described for example, at least with respect to L2TAG1 described in Intel® Ethernet Adaptive Virtual Function (AVF) Specification or similar descriptors. In some examples, driver 1365 can update L2TAG1 or another field to a convey a packet sequence number for a payload.

In some examples, a packet sequence number can use one field in a list that is 16 bits (or other sizes) which could be dynamically changed without affecting performance. A largest packet sequence number [0xfff0~0xffff] could be reserved for special purpose, e.g., 0xfff0 for in-band ACK packet.

In this example, at (2), a descriptor received via TX queue 1367 can instruct NIC 1370 to add header fields to headers of packets 1-3. Server A can identify payloads for packets 1-3 to transmit to NIC 1370 using TX queue 1367 (e.g., a transmit descriptor queue). At Server A, NIC 1370 can add a header to payloads from Service A for packets 1-3, with distinct packet sequence numbers 1-3 conveyed in packet headers, and transmit packets 1-3 to NIC 1390 of Server B. NIC 1370 can utilize direct memory access (DMA) to access a copy a payload and header. NIC 1370 can utilize large segmentation offload (LSO) and header split to access header and payloads separately. NIC 1370 can form packets based on an applicable maximum transmission unit (MTU) size and can use a same header fields (but with different sequence numbers) to transmit packets 1-3. In NIC 1370, cryptography circuitry can be used to encrypt or decrypt packets (e.g., TLS, IPSec, or MACSec). In some examples, NIC 1370 can utilize a programmable data plane to perform packet encryption or decryption. An HPR socket of driver 1365 if server A can setup a secure connection with handshake with peer HPR socket of driver 1355 of server B and negotiate a security key for AF_XDP socket to encrypt/decrypt packets. Other reliability solutions such as Forward Error Correction could be implemented at transmitter and/or receiver.

Packets 1-3 can be transmitted using UDP, Ethernet, or other protocols. Various embodiments can use an address mapping for a connection (e.g. 192.168.3.3 UDP port 447 is mapped to MAC address 3c:fd:fe:b8:96:29), and driver 1365 can use this MAC address to perform connection management directly without the application identifying the difference.

At Server B, NIC 1390 can process Ethernet header, IP header, UDP header and other header fields and NIC 1390 can provide payloads of received packets to a buffer for access by service B using RX queue 1357). In some examples, NIC 1390 can perform RX header split to separately copy a packet header and packet payload to different memory destinations. In this example, packets 1 and 3 are received at server 1380 (server B) but packet 2 is not received by Server B. In some examples, AF_XDP driver 1385 can convert a receive descriptor format for access by Service B. At (4), at server B, AF_XDP/HPR driver 1385 can indicate packets 1 and 3 were received by descriptors for packets 1 and 3 in AF_XDP reorder queue 1383 with an empty slot for a descriptor for packet 2. In some examples, packet reordering can be performed using receive descriptors in AF_XDP reorder queue 1383.

Driver 1385 for server B can cause transmission of receipt acknowledgement (ACK) to server A to indicate packets 1 and 3 were received. Server A receives ACKs for packets 1 and 3 and, at (5), releases descriptors for packets 1 and 3 from completion queue 1363. Completion queue 1363 can be used to transfer completed descriptors from driver 1365 to service A.

Figure 13C:
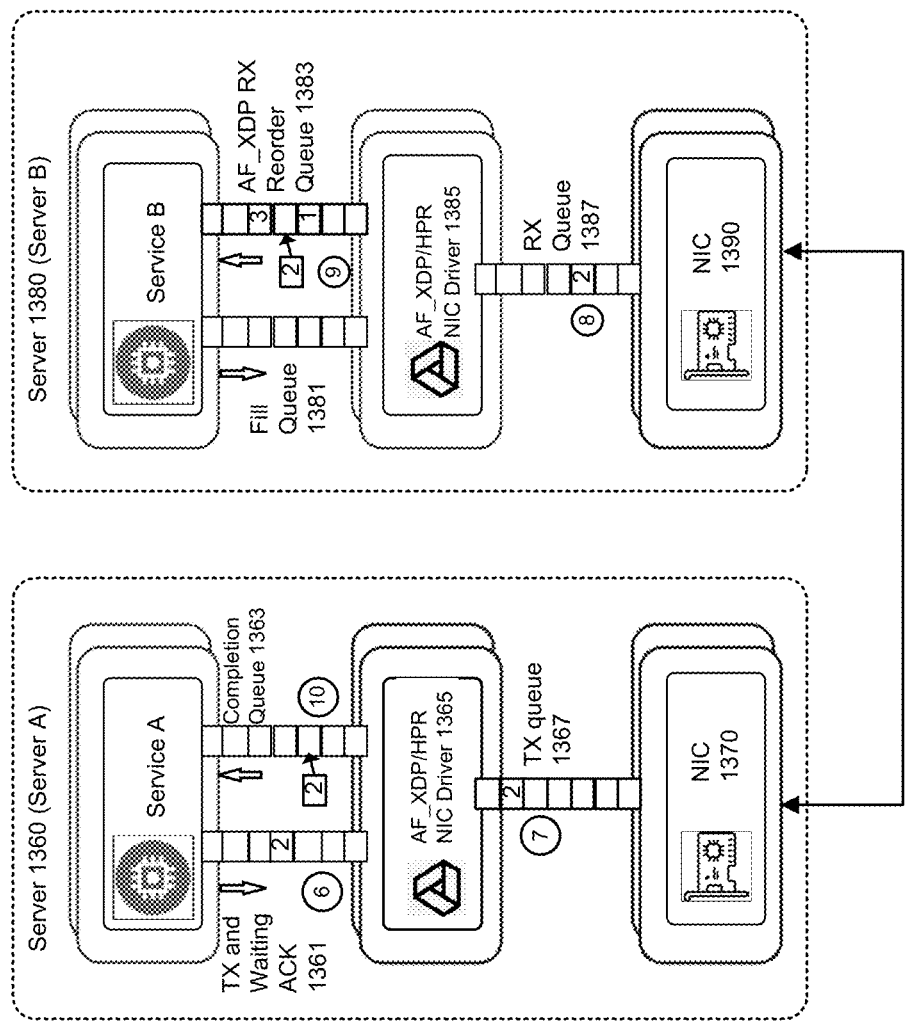

Referring to FIG. 13C, at (6), TX and waiting ACK queue can identify packet 2 to be resent and packet 2 is resent at (7). After receipt of resent packet 2, at (8), RX queue 1387 can be updated to indicate a descriptor that indicates receipt of packet 2. At (9), Server B can place an RX descriptor for resent packet 2 in an empty slot reserved for packet 2 in AF_XDP RX reorder queue 1383. For example, Service B can use AF_XDP reorder queue 1383 to provide descriptors of payload of packets 1-3 for access by Service B. A Fill Queue can be used by service B to transfer descriptors that identify available buffers to store received packets to driver 1385. NIC 1390 can post the headers for packets 1-3 to kernel space and post payloads for packets 1-3 to user space for access by Service B.

In some examples, flow control and ACK can utilize credit-based flow-control scheme, where a current credit number is an empty descriptor number left in RX ring and credits already used. A driver can advertise this credit when tail/header change for RX ring. Credits could be used for allocation to ACK packets.

In some examples, connection management messages can be sent from transmitter to receiver or receiver to transmitter using UDP packets through a kernel stack.

Some embodiments relate to uses of NICs and a service mesh as an example target, but embodiments are not limited thereto. Various embodiments can apply to all NICs that can support RX header split, TX header buffer, queue steering, and/or packet sequence number insertion or extraction. Other NICs may dynamically insert a packet number to packet's other fields (e.g. IP header or a VLAN Tag). Various embodiments may utilize various protocols, e.g., NVMe over Fabrics (NVMe-oF), NVMe over RDMA over Converged Ethernet (RoCE), NVMe over iWARP, or NVMe over TCP.

Various embodiments may utilize in-network telemetry (INT) to encapsulate end-to-end tags such in a UDP encapsulation. INT is a framework designed to allow the collection and reporting of network device state. INT information can be encapsulated in a UDP header. In some embodiments, a packet number can be conveyed information in INT information. A rule can be configured in a programmable data plane of a switch to copy a packet number from a VLAN tag to UDP encapsulation in the transmit side, and restore the packet number from UDP encapsulation to VLAN tag in the receive side.

Figure 14:
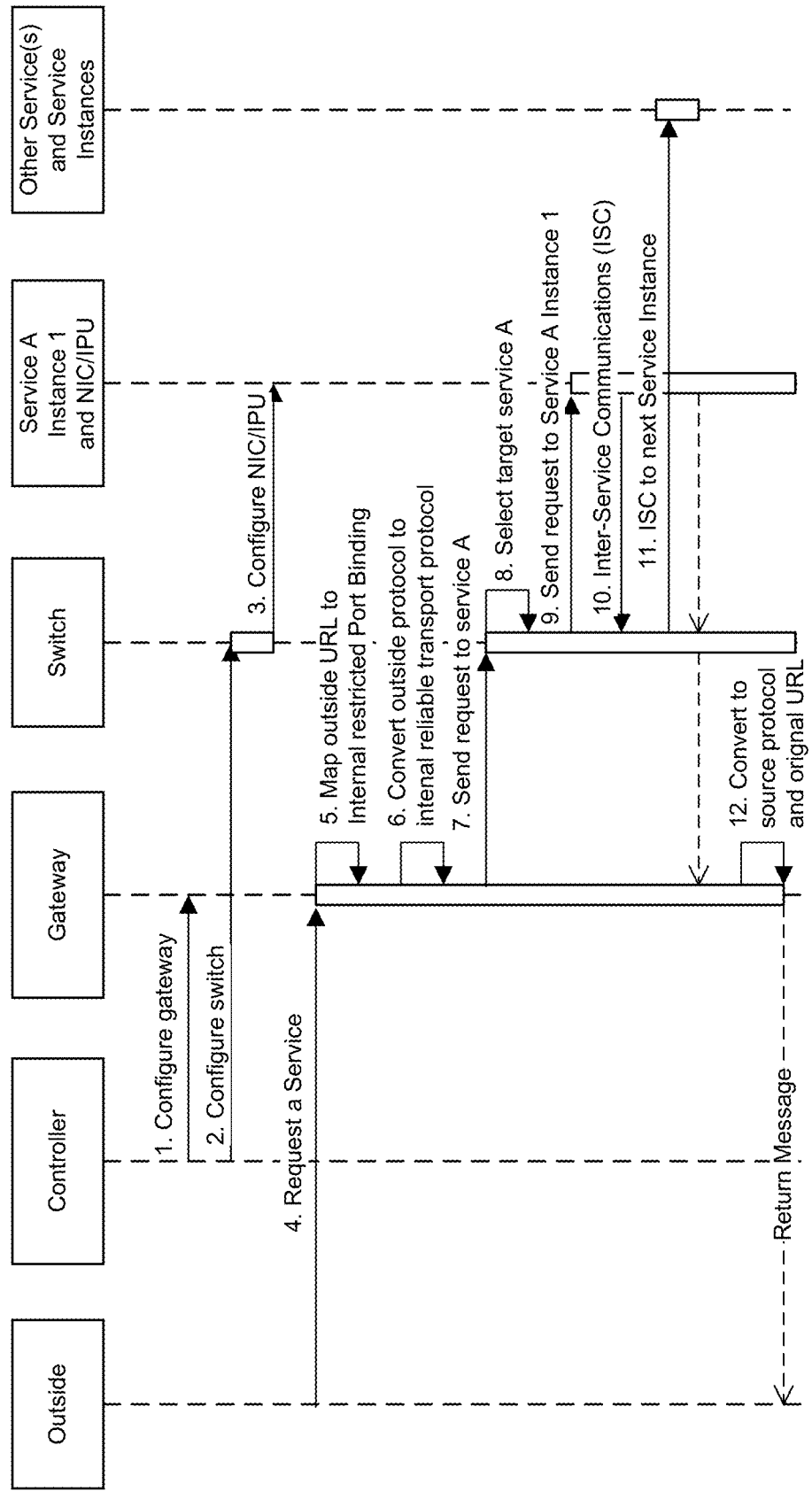
FIG. 14 depicts a sequence diagram.

FIG. 14 depicts a sequence diagram of some examples. In this example, actions 1-3 can correspond to configuration whereas actions 4-12 can correspond to performing a request using one or more microservices. At action 1, a service mesh controller can configure service mapping, security (e.g., encryption scheme, decryption scheme, keys, password, etc.) of a gateway NIC. Any type of protocol can be used to configure the gateway NIC such as a proprietary protocol or standardized protocol. At action 2, the service mesh controller can configure traffic policy and load balancer features performed by a switch. The service mesh controller can interact with the gateway's NIC as though interacting with a core executing a proxy or message forwarding system such as Envoy, AppMesh, OSM, and so forth. Any type of protocol can be used to configure the gateway NIC such as a proprietary protocol or standardized protocol.

At action 3, the switch can configure a reliable transport feature of one or more NICs used in a service mesh as well as the reliable transport feature of gateway using in-band and/or out-band techniques. Reliable transport features of one or more NICs used in a service mesh as well as the reliable transport feature of gateway can include security (e.g., encryption scheme, decryption scheme, keys, password, etc.). In some examples, an agent in a host can communicate with the service mesh controller to retrieve reliable transport configurations from the switch.

At action 4, a service request can be received at a gateway of a service mesh. The service request can be issued by an application, virtual machine, microservice, or other source. The service request can be associated with a URL. At action 5, the gateway can map a URL to a restricted port binding. For example, gateway can map a restricted port binding serviceA:80 to URL some.com/serviceA. At action 6, the gateway can perform transcoding between a protocol used by a sender to the gateway (e.g., Rest API) to an internal protocol used in the service mesh (e.g. Google remote procedure call (gRPC) or others). At action 6, translation between a reliable transport protocol used by the sender of the request (e.g., TCP, UDP, or QUIC) can occur to the reliable transport protocol used in the service mesh for communication between the gateway NIC, a switch, and NICs for servers executing services. At action 7, the gateway can access a routing table to determine path to the switch and send the received request to the switch. In some examples, the switch is a top of rack (ToR) switch that may provide a proxy of communications between microservices in a service mesh, as well as perform load balancing among available microservices. At action 8, the switch can perform load balancing (LB) to organize the service request into one or more microservices. Load balancing among available instances of microservices can be performed to provide appropriate quality of service by selecting a microservice running on a platform that is not overburdened and can complete performance of the microservice in time specified by an applicable service level agreement (SLA). For example, service A instance 1 (e.g., microservice A instance 1) can be registered as serviceA1:88. At action 9, the switch can send the request to the server that performs service A instance 1 to perform a microservice for the requested service.

At action 10, service A executing on a processor (e.g., in a server, a NIC or IPU) can execute a microservice and discover other services to request to execute next. For example, the service A can discover other services to request to execute next by access to a Domain Name System (DNS). For example, Service A can create a service sequence and request execution of a service B and trigger a load balancing by the switch among available instances of Service B or execution of a single available instance of Service B depending on the load balancing configuration. Inter-service communications (ISC) can utilize reliable transport described herein. In cases where the load balancing and traffic policy rules are stored in a NIC or host CPU software, the NIC used by Service A may be able to bypass the switch and request execution of other service instances directly.

At action 11, the switch can issue an ISC to a compute platform that executes Service B (e.g., microservice B) to execute Service B. Return messages can be issued from the device (e.g., core, NIC, IPU) that executes Service B to the device that executed Service A via the switch or directly to Service A. After completion of Service B, the switch can inform the gateway that the requested service has been performed.

At action 12, the gateway can convert the response from the switch to a protocol used by the requester, such as from a reliable transport protocol of the service mesh to a protocol used by the requester (e.g., TCP, UDP, QUIC, and so forth) to receive requests from the gateway. The gateway can send the response to the URL as a return message. For example, the return message can include a packet that includes a response to a request (e.g., image, text, webpage, database entry, video, and so forth).

Figure 15A:
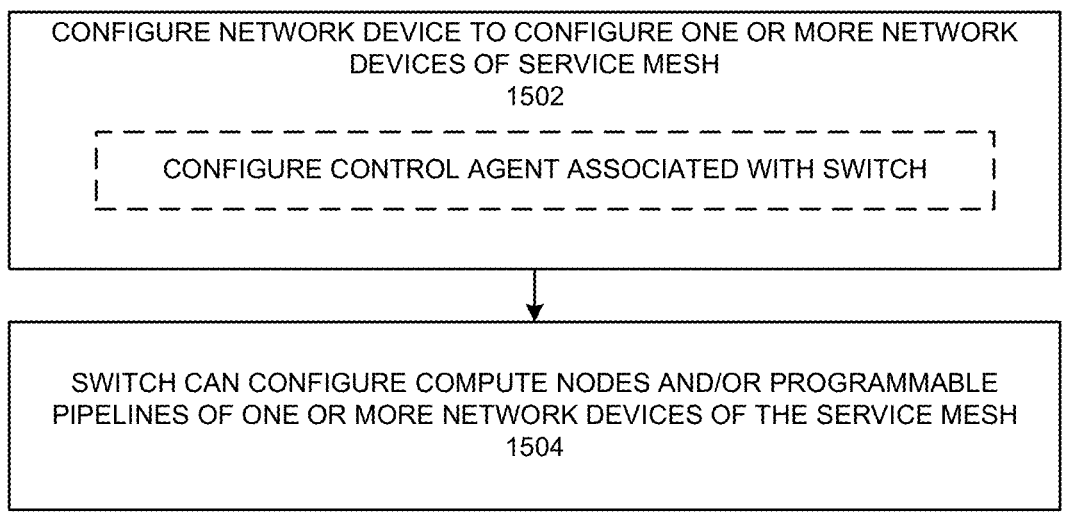
FIG. 15A depicts an example process that can be used to configure communications within a service mesh using programmable data planes of network devices.

FIG. 15A depicts an example process that can be used to configure communications within a service mesh using programmable data planes of network devices. At 1502, a controller can configure a network device to configure one or more network devices that are part of a service mesh. For example, the controller can include a service mesh controller. For example, the network device that is to configure one or more network devices that are part of a service mesh can include a switch. The switch can be used for communications in the service mesh as well. For example, the one or more network devices that are part of a service mesh can include a gateway network device and one or more network devices associated with compute nodes that execute instances of microservices. In some examples, a network device can include a NIC, smartNIC, and/or IPU. In some examples, one or more network devices of the service mesh can include at least one programmable packet processing pipeline.

In 1502, configuration of the one or more of the network device of the service mesh can be performed by configuring a control agent associated with the switch. For example, the control agent can perform microservice proxying to provide microservice-to-microservice communication. In some examples, the control agent is executed by the switch or a compute node coupled to the switch. In some examples, the control agent can configure at least one programmable packet processing pipeline of the one or more network devices of the service mesh. For example, programming the programmable packet processing pipeline of the switch can include configuring load balancing policies to select among available microservice instances, telemetry collection and dissemination, and/or a traffic policy applied to determine a path of packets between servers or network devices that execute microservices.

At 1504, the switch can configure compute nodes and/or other network devices of the service mesh. For example, compute nodes can include servers, or processors that are part of network devices. For example, other network devices of the service mesh can include a gateway network device and network devices associated with compute nodes that execute services and instances of services. For example configuration of a compute node and/or network device associated with a gateway can include configuring the compute node and/or programmable pipeline of the gateway network device to perform one or more of: one service-to-one port binding; implementation of a reliable transport protocol; encryption/decryption; and/or telemetry reporting. For example, configuration of a compute node and/or network device associated with execution of a microservice instance can include configuring the compute node and/or programmable pipeline of the network device to perform one or more of: implementation of a reliable transport protocol; encryption/decryption; and/or telemetry reporting.

Figure 15B:
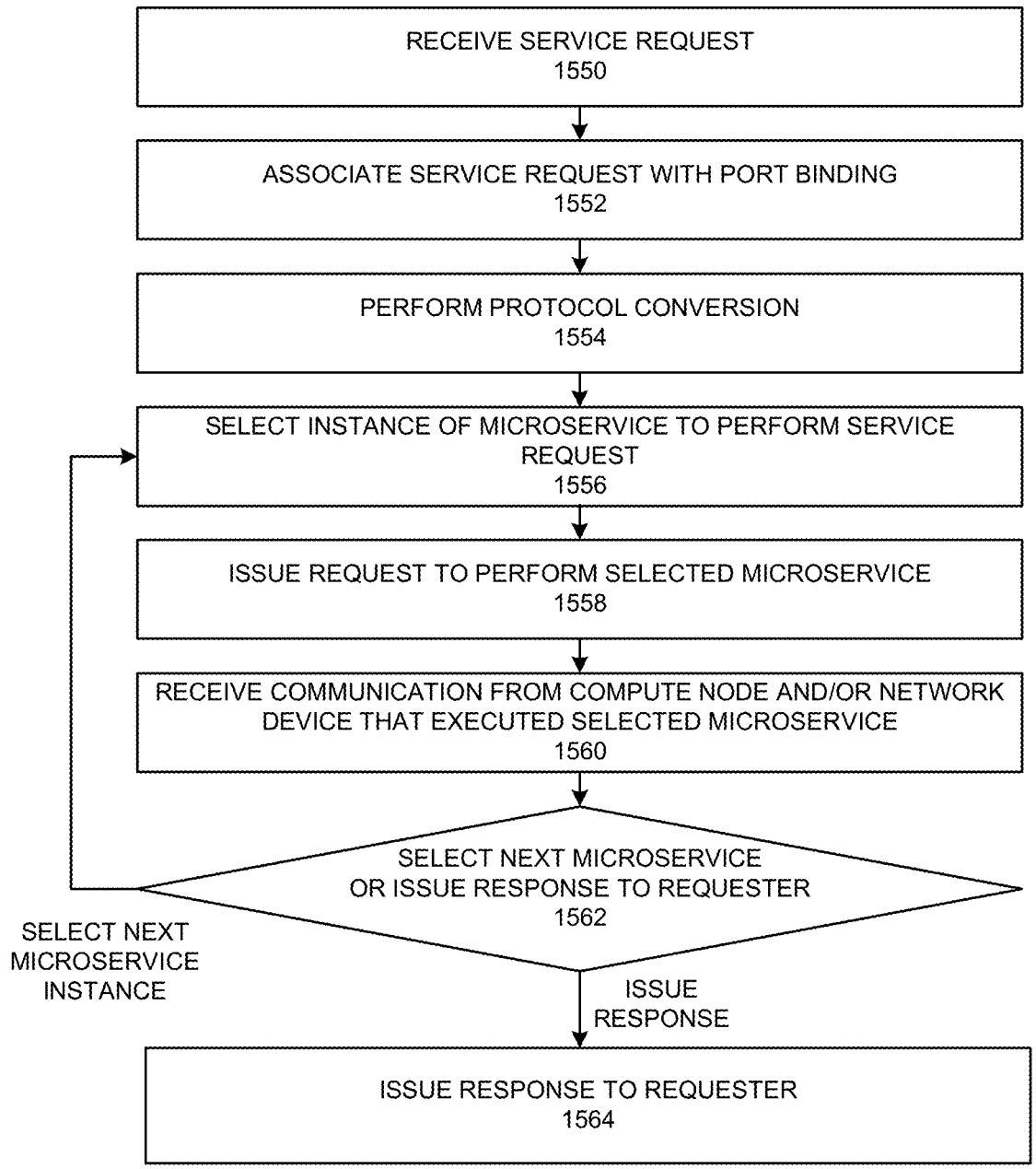
FIG. 15B depicts an example process that can be used to communicate within a service mesh.

FIG. 15B depicts an example process that can be used to communicate within a service mesh. At 1550, the gateway can receive a service request to be performed using microservices associated with a service mesh. At 1552, the gateway can associate the URI or URL of the service request to a port binding. At 1554, the gateway can perform protocol conversion to convert a reliable transport protocol used to send the service request to the gateway to a reliable transport protocol used in the service mesh. At 1556, the gateway select an instance of a microservice to perform for the service request. For example, an instance of a microservice can be selected based on a utilization level of a compute node and/or network device that executes microservices that are available to select. For example, utilization level can be determined based on one or more of: compute resources availability, memory bandwidth availability, network device bandwidth availability, and so forth. At 1558, the gateway can issue a request to perform a microservice to the compute node and/or network device that executes the selected microservice. The request to perform the microservice can be sent using a reliable transport protocol of the service mesh. At 1560, the gateway can receive a communication from the compute node and/or network device that executed the selected microservice. The communication can include a request to perform another microservice and/or a result of the performance of the selected microservice. At 1562, in response to receipt of a request to perform another microservice, the process can proceed to 1556, where the gateway can select an instance of the another microservice based on load balancing and the process can proceed. At 1562, in response to receipt of the result of the performance of the selected microservice, the process can proceed to 1564, where the gateway can translate a format of the result to a format for transmission to the service requester. For example, protocol conversion and identification of the URL can take place in 1560.

Figure 16:
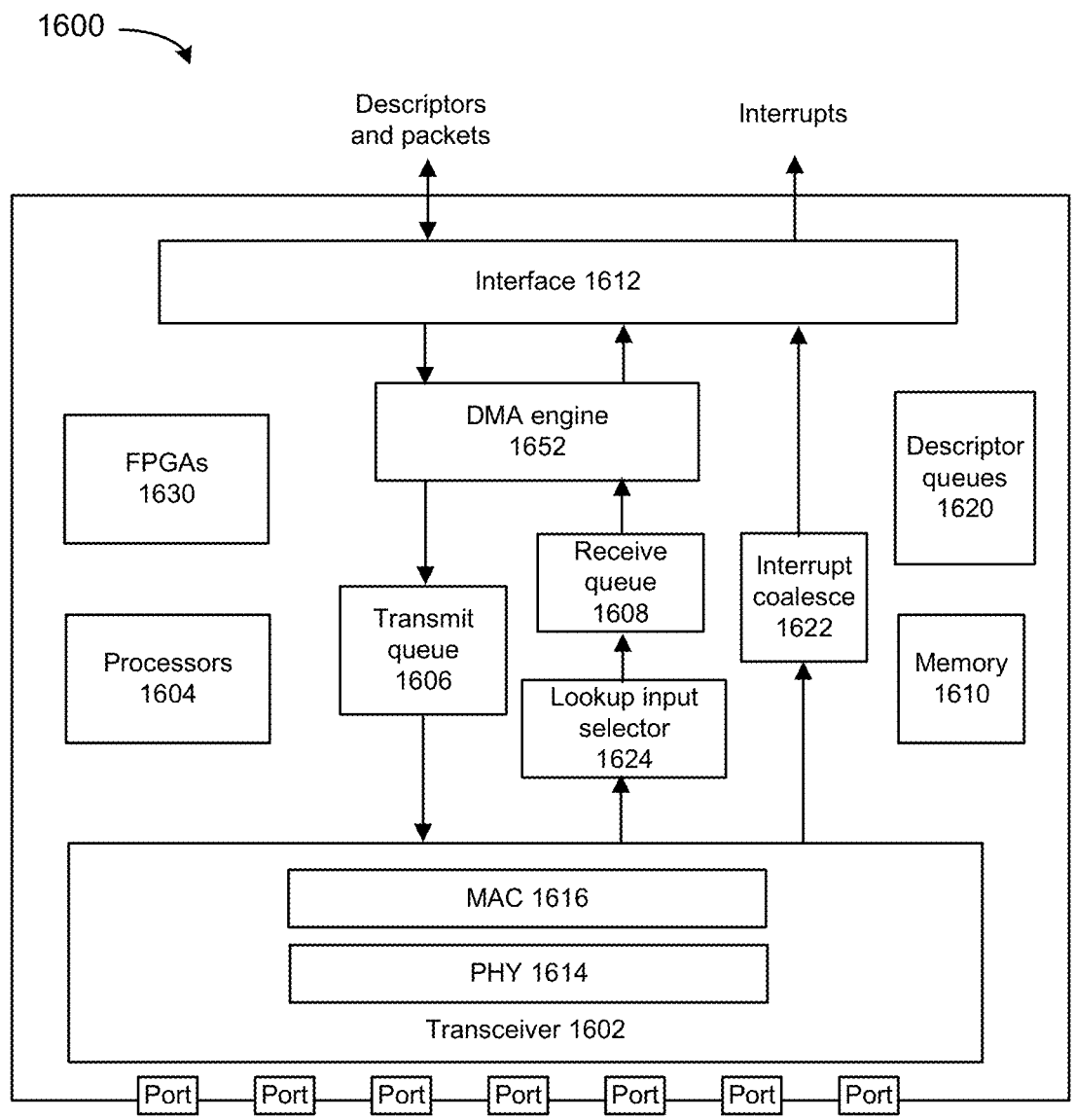
FIG. 16 depicts a network interface that can use embodiments or be used by embodiments.

FIG. 16 depicts a network interface that can use embodiments or be used by embodiments. Various processor resources and the network interface can perform microservice selection and communication in accordance with embodiments described herein. In some examples, network interface 1600 can be implemented as a network interface controller, network interface card, a host fabric interface (HFI), or host bus adapter (HBA), and such examples can be interchangeable. Network interface 1600 can be coupled to one or more servers using a bus, PCIe, CXL, or DDR. Network interface 1600 may be embodied as part of a system-on-a-chip (SoC) that includes one or more processors, or included on a multichip package that also contains one or more processors.

Some examples of network device 1600 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 1600 can include transceiver 1602, processors 1604, transmit queue 1606, receive queue 1608, memory 1610, and bus interface 1612, and DMA engine 1652. Transceiver 1602 can be capable of receiving and transmitting packets in conformance with the applicable protocols such as Ethernet as described in IEEE 802.3, although other protocols may be used. Transceiver 1602 can receive and transmit packets from and to a network via a network medium (not depicted). Transceiver 1602 can include PHY circuitry 1614 and media access control (MAC) circuitry 1616. PHY circuitry 1614 can include encoding and decoding circuitry (not shown) to encode and decode data packets according to applicable physical layer specifications or standards. MAC circuitry 1616 can be configured to perform MAC address filtering on received packets, process MAC headers of received packets by verifying data integrity, remove preambles and padding, and provide packet content for processing by higher layers. MAC circuitry 1616 can be configured to assemble data to be transmitted into packets, that include destination and source addresses along with network control information and error detection hash values.

Processors 1604 can be any a combination of a: processor, core, graphics processing unit (GPU), field programmable gate array (FPGA), application specific integrated circuit (ASIC), or other programmable hardware device that allow programming of network interface 1600. For example, processors 1604 can provide for identification of a resource to use to perform a workload and generation of a bitstream for execution on the selected resource. For example, a "smart network interface" can provide packet processing capabilities in the network interface using processors 1604.

Packet allocator 1624 can provide distribution of received packets for processing by multiple CPUs or cores using timeslot allocation described herein or RSS. When packet allocator 1624 uses RSS, packet allocator 1624 can calculate a hash or make another determination based on contents of a received packet to determine which CPU or core is to process a packet.

Interrupt coalesce 1622 can perform interrupt moderation whereby network interface interrupt coalesce 1622 waits for multiple packets to arrive, or for a time-out to expire, before generating an interrupt to host system to process received packet(s). Receive Segment Coalescing (RSC) can be performed by network interface 1600 whereby portions of incoming packets are combined into segments of a packet. Network interface 1600 provides this coalesced packet to an application.

Direct memory access (DMA) engine 1652 can copy a packet header, packet payload, and/or descriptor directly from host memory to the network interface or vice versa, instead of copying the packet to an intermediate buffer at the host and then using another copy operation from the intermediate buffer to the destination buffer.

Memory 1610 can be any type of volatile or non-volatile memory device and can store any queue or instructions used to program network interface 1600. Transmit queue 1606 can include data or references to data for transmission by network interface. Receive queue 1608 can include data or references to data that was received by network interface from a network. Descriptor queues 1620 can include descriptors that reference data or packets in transmit queue 1606 or receive queue 1608. Bus interface 1612 can provide an interface with host device (not depicted). For example, bus interface 1612 can be compatible with PCI, PCI Express, PCI-x, Serial ATA, and/or USB compatible interface (although other interconnection standards may be used).

Figure 17:
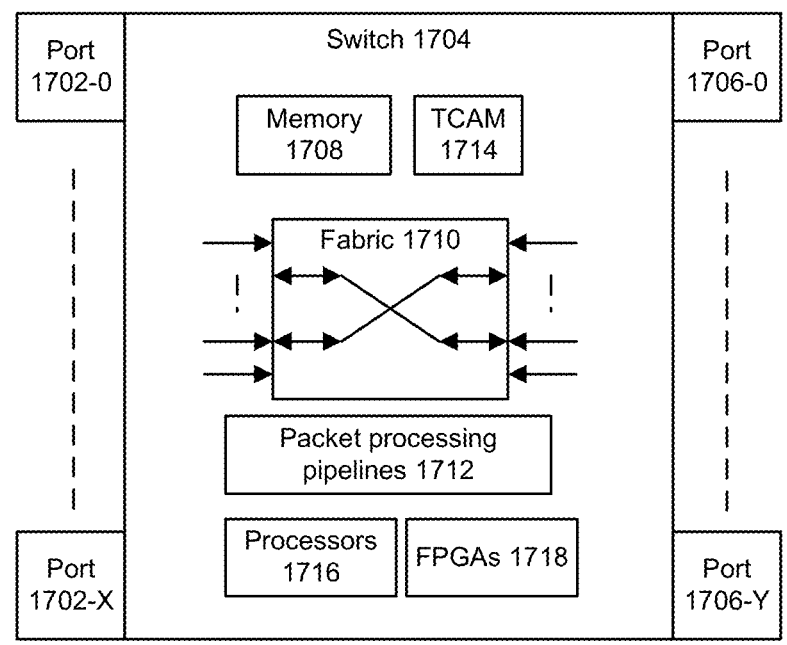
FIG. 17 depicts an example switch.

FIG. 17 depicts an example switch. Various resources in the switch (e.g., packet processing pipelines 1712, processors 1716, and/or FPGAs 1718) can perform microservice selection (e.g., load balancing), traffic policy application, communication, and telemetry dissemination and analysis in accordance with embodiments described herein. Switch 1704 can route packets or frames of any format or in accordance with any specification from any port 1702-0 to 1702-X to any of ports 1706-0 to 1706-Y (or vice versa). Any of ports 1702-0 to 1702-X can be connected to a network of one or more interconnected devices. Similarly, any of ports 1706-0 to 1706-X can be connected to a network of one or more interconnected devices.

In some examples, switch fabric 1710 can provide routing of packets from one or more ingress ports for processing prior to egress from switch 1704. Switch fabric 1710 can be implemented as one or more multi-hop topologies, where example topologies include torus, butterflies, buffered multistage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 1708 can be configured to store packets received at ports prior to egress from one or more ports. Packet processing pipelines 1712 can determine which port to transfer packets or frames to using a table that maps packet characteristics with an associated output port. Packet processing pipelines 1712 can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 1712 can implement access control list (ACL) or packet drops due to queue overflow. Packet processing pipelines 1712 can be configured to add operation and telemetry data concerning switch 1704 to a packet prior to its egress.

Configuration of operation of packet processing pipelines 1712, including its data plane, can be programmed using P4, C, Python, Broadcom Network Programming Language (NPL), or x86 compatible executable binaries or other executable binaries. Processors 1716 and FPGAs 1718 can be utilized for packet processing or modification.

Figure 18:
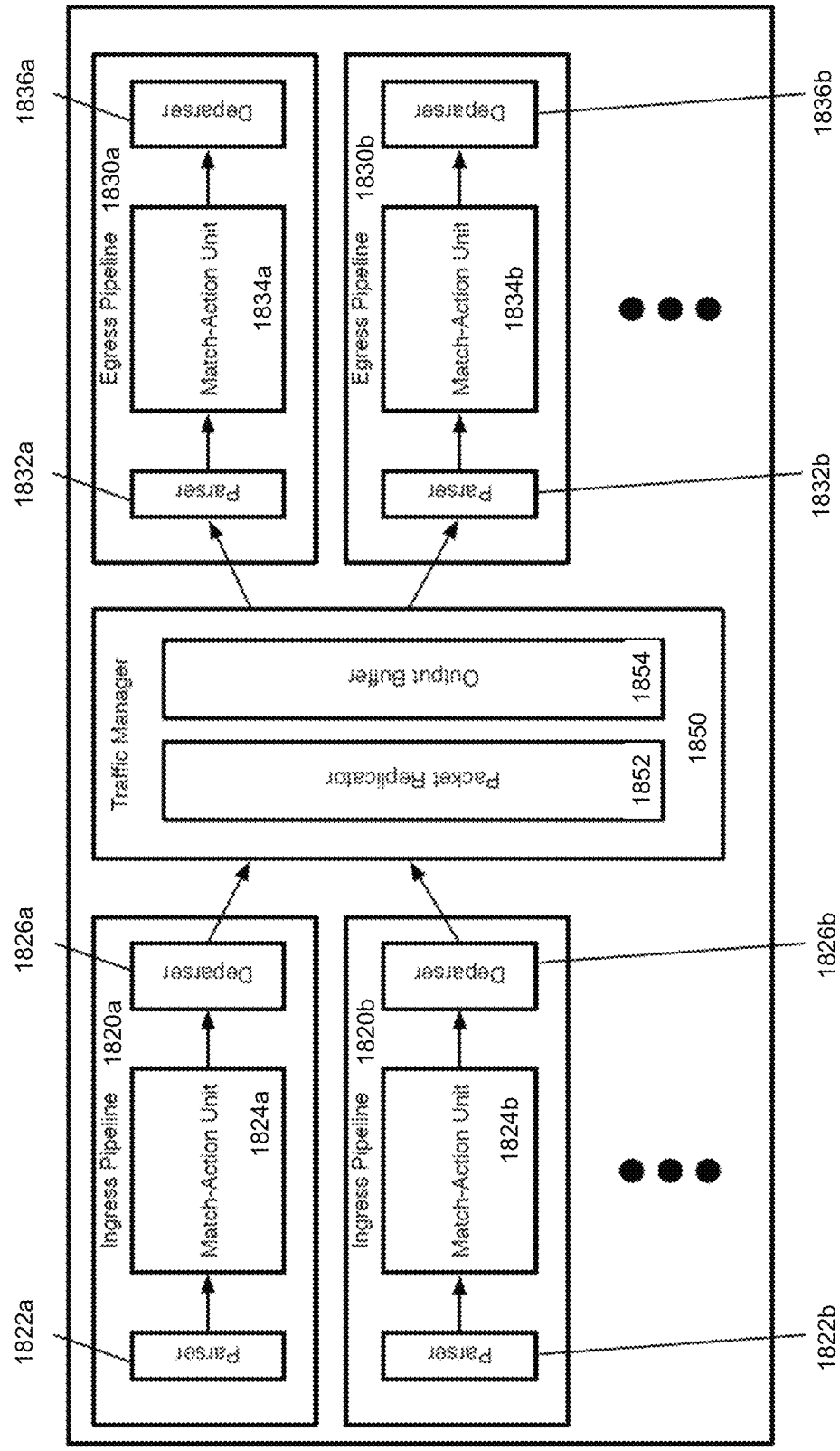
FIG. 18 depicts an example programmable packet processing pipeline.

FIG. 18 depicts an example programmable packet processing pipeline that can be used in a switch or router to perform at least microservice selection (e.g., load balancing of microservices), network element telemetry sharing or analysis, and communication in accordance with embodiments described herein. Various embodiments of a network interface or IPU can include a programmable packet processing pipeline to perform at least reliable transport, encryption/decryption, and/or telemetry sharing or analysis in accordance with embodiments described herein. For example, FIG. 18 illustrates several ingress pipelines 1820, a traffic management unit (referred to as a traffic manager) 1850, and several egress pipelines 1830. Though shown as separate structures, in some embodiments the ingress pipelines 1820 and the egress pipelines 1830 can use the same circuitry resources. In some embodiments, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other embodiments, the ingress and egress pipelines are separate circuitry. In some of these other embodiments, the ingress pipelines also process the non-packet data.

In some examples, in response to receiving a packet, the packet is directed to one of the ingress pipelines 1820 where an ingress pipeline which may correspond to one or more ports of a hardware forwarding element. After passing through the selected ingress pipeline 1820, the packet is sent to the traffic manager 1850, where the packet is enqueued and placed in the output buffer 1854. In some embodiments, the ingress pipeline 1820 that processes the packet specifies into which queue the packet is to be placed by the traffic manager 1850 (e.g., based on the destination of the packet or a flow identifier of the packet). The traffic manager 1850 then dispatches the packet to the appropriate egress pipeline 1830 where an egress pipeline may correspond to one or more ports of the forwarding element. In some embodiments, there is no necessary correlation between which of the ingress pipelines 1820 processes a packet and to which of the egress pipelines 1830 the traffic manager 1850 dispatches the packet. That is, a packet might be initially processed by ingress pipeline 1820*b* after receipt through a first port, and then subsequently by egress pipeline 1830*a* to be sent out a second port, etc.

A least one ingress pipeline 1820 includes a parser 1822, a match-action unit (MAU) 1824, and a deparser 1826. Similarly, egress pipeline 1830 can include a parser 1832, a MAU 1834, and a deparser 1836. The parser 1822 or 1832, in some embodiments, receives a packet as a formatted collection of bits in a particular order, and parses the packet into its constituent header fields. In some examples, the parser starts from the beginning of the packet and assigns header fields to fields (e.g., data containers) for processing. In some embodiments, the parser 1822 or 1832 separates out the packet headers (up to a designated point) from the payload of the packet, and sends the payload (or the entire packet, including the headers and payload) directly to the deparser without passing through the MAU processing.

The MAU 1824 or 1834 can perform processing on the packet data. In some embodiments, the MAU includes a sequence of stages, with each stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU. For example, using an MAU, telemetry data for a forwarding element can be gathered and sent to another network device, switch, router, or endpoint receiver or transmitter in one or more packets.

The deparser 1826 or 1836 can reconstruct the packet using a packet header vector (PHV) as modified by the MAU 1824 or 1834 and the payload received directly from the parser 1822 or 1832. The deparser can construct a packet that can be sent out over the physical network, or to the traffic manager 1850. In some embodiments, a deparser can construct this packet based on data received along with the PHV that specifies the protocols to include in the packet header, as well as its own stored list of data container locations for each possible protocol's header fields.

For example, at least traffic policy, telemetry generation, load balancing, reliable protocol, and security operations can be implemented by MAUs 1824 or 1834. For example, reliable protocol, and security operations can be performed using parser 1822 or 1832 and deparser 1826 or 1836.

Traffic manager 1850 can include a packet replicator 1852 and output buffer 1854. In some embodiments, the traffic manager 1850 may include other components, such as a feedback generator for sending signals regarding output port failures, a series of queues and schedulers for these queues, queue state analysis components, as well as additional components. The packet replicator 1852 of some embodiments performs replication for broadcast/multicast packets, generating multiple packets to be added to the output buffer (e.g., to be distributed to different egress pipelines).

Output buffer 1854 can be part of a queuing and buffering system of the traffic manager in some embodiments. Traffic manager 1850 can provide a shared buffer that accommodates any queuing delays in the egress pipelines. In some embodiments, this shared output buffer 1854 can store packet data, while references (e.g., pointers) to that packet data are kept in different queues for each egress pipeline 1830. The egress pipelines can request their respective data from the common data buffer using a queuing policy that is control-plane configurable. When a packet data reference reaches the head of its queue and is scheduled for dequeuing, the corresponding packet data can be read out of the output buffer 1854 and into the corresponding egress pipeline 1830. In some embodiments, packet data may be referenced by multiple pipelines (e.g., for a multicast packet). In this case, the packet data is not removed from this output buffer 1854 until all references to the packet data have cleared their respective queues.

Figure 19:
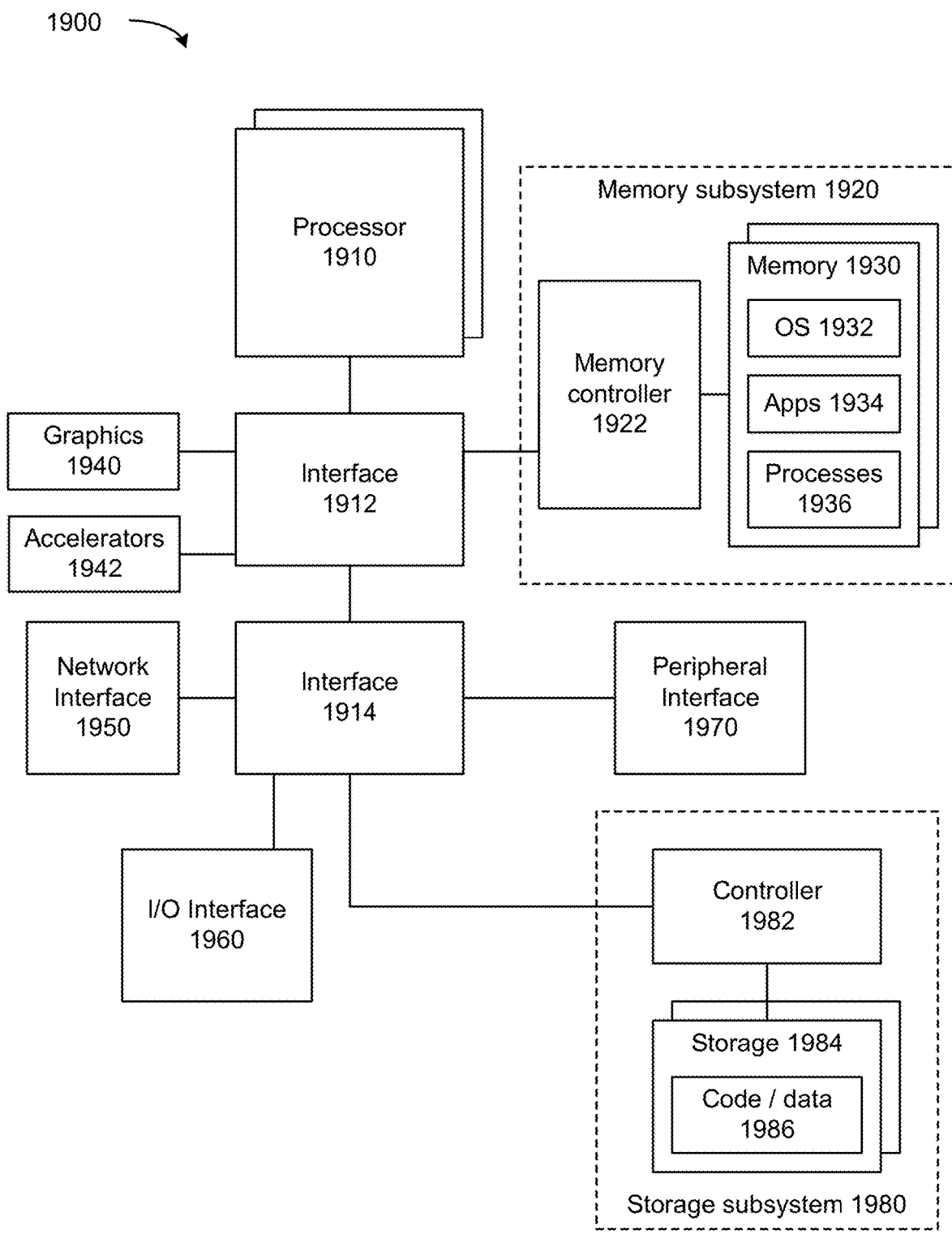
FIG. 19 depicts an example computing system.

FIG. 19 depicts an example computing system. Various embodiments can use components of system 1900 (e.g., processor 1910, network interface 1950, and so forth) to perform microservice selection and communications in accordance with embodiments described herein. System 1900 includes processor 1910, which provides processing, operation management, and execution of instructions for system 1900. Processor 1910 can include any type of microprocessor, central processing unit (CPU), graphics processing unit (GPU), processing core, or other processing hardware to provide processing for system 1900, or a combination of processors. Processor 1910 controls the overall operation of system 1900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1900 includes interface 1912 coupled to processor 1910, which can represent a higher speed interface or a high throughput interface for system components that needs higher bandwidth connections, such as memory subsystem 1920 or graphics interface components 1940, or accelerators 1942. Interface 1912 represents an interface circuit, which can be a standalone component or integrated onto a processor die. Where present, graphics interface 1940 interfaces to graphics components for providing a visual display to a user of system 1900. In one example, graphics interface 1940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1940 generates a display based on data stored in memory 1930 or based on operations executed by processor 1910 or both. In one example, graphics interface 1940 generates a display based on data stored in memory 1930 or based on operations executed by processor 1910 or both.

Accelerators 1942 can be a fixed function or programmable offload engine that can be accessed or used by a processor 1910. For example, an accelerator among accelerators 1942 can provide compression (DC) capability, cryptography services such as public key encryption (PKE), cipher, hash/authentication capabilities, decryption, or other capabilities or services. In some embodiments, in addition or alternatively, an accelerator among accelerators 1942 provides field select controller capabilities as described herein. In some cases, accelerators 1942 can be integrated into a CPU socket (e.g., a connector to a motherboard or circuit board that includes a CPU and provides an electrical interface with the CPU). For example, accelerators 1942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1942 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1920 represents the main memory of system 1900 and provides storage for code to be executed by processor 1910, or data values to be used in executing a routine. Memory subsystem 1920 can include one or more memory devices 1930 such as read-only memory (ROM), flash memory, one or more varieties of random access memory (RAM) such as DRAM, or other memory devices, or a combination of such devices. Memory 1930 stores and hosts, among other things, operating system (OS) 1932 to provide a software platform for execution of instructions in system 1900. Additionally, applications 1934 can execute on the software platform of OS 1932 from memory 1930. Applications 1934 represent programs that have their own operational logic to perform execution of one or more functions. Processes 1936 represent agents or routines that provide auxiliary functions to OS 1932 or one or more applications 1934 or a combination. OS 1932, applications 1934, and processes 1936 provide software logic to provide functions for system 1900. In one example, memory subsystem 1920 includes memory controller 1922, which is a memory controller to generate and issue commands to memory 1930. It will be understood that memory controller 1922 could be a physical part of processor 1910 or a physical part of interface 1912. For example, memory controller 1922 can be an integrated memory controller, integrated onto a circuit with processor 1910.

In some examples, OS 1932 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

While not specifically illustrated, it will be understood that system 1900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1900 includes interface 1914, which can be coupled to interface 1912. In one example, interface 1914 represents an interface circuit, which can include standalone components and integrated circuitry. In one example, multiple user interface components or peripheral components, or both, couple to interface 1914. Network interface 1950 provides system 1900 the ability to communicate with remote devices (e.g., servers or other computing devices) over one or more networks. Network interface 1950 can include an Ethernet adapter, wireless interconnection components, cellular network interconnection components, USB (universal serial bus), or other wired or wireless standards-based or proprietary interfaces. Network interface 1950 can transmit data to a device that is in the same data center or rack or a remote device, which can include sending data stored in memory. Network interface 1950 can receive data from a remote device, which can include storing received data into memory.

In one example, system 1900 includes one or more input/output (I/O) interface(s) 1960. I/O interface 1960 can include one or more interface components through which a user interacts with system 1900 (e.g., audio, alphanumeric, tactile/touch, or other interfacing). Peripheral interface 1970 can include any hardware interface not specifically mentioned above. Peripherals refer generally to devices that connect dependently to system 1900. A dependent connection is one where system 1900 provides the software platform or hardware platform or both on which operation executes, and with which a user interacts.

In one example, system 1900 includes storage subsystem 1980 to store data in a nonvolatile manner. In one example, in certain system implementations, at least certain components of storage 1980 can overlap with components of memory subsystem 1920. Storage subsystem 1980 includes storage device(s) 1984, which can be or include any conventional medium for storing large amounts of data in a nonvolatile manner, such as one or more magnetic, solid state, or optical based disks, or a combination. Storage 1984 holds code or instructions and data 1986 in a persistent state (e.g., the value is retained despite interruption of power to system 1900). Storage 1984 can be generically considered to be a "memory," although memory 1930 is typically the executing or operating memory to provide instructions to processor 1910. Whereas storage 1984 is nonvolatile, memory 1930 can include volatile memory (e.g., the value or state of the data is indeterminate if power is interrupted to system 1900). In one example, storage subsystem 1980 includes controller 1982 to interface with storage 1984. In one example controller 1982 is a physical part of interface

1914 or processor 1910 or can include circuits or logic in both processor 1910 and interface 1914.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1900. More specifically, power source typically interfaces to one or multiple power supplies in system 1900 to provide power to the components of system 1900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (ROCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z.'"

Illustrative examples of the devices, systems, and methods disclosed herein are provided below. An embodiment of the devices, systems, and methods may include one or more, and combination of, the examples described below.

Example 1 includes a system comprising: a switch comprising a programmable data plane pipeline, wherein the programmable data plane pipeline is configured to provide microservice-to-microservice communications within a service mesh.

Example 2 includes one or more examples, wherein to provide microservice-to-microservice communications within a service mesh, the programmable data plane pipeline is to perform a forwarding operation for a communication from a first microservice to a second microservice.

Example 3 includes one or more examples, wherein to perform a forwarding operation for a communication from a first microservice to a second microservice, the programmable data plane pipeline is to utilize a reliable transport protocol.

Example 4 includes one or more examples, wherein the programmable data plane pipeline is to select a processor, virtual machine, or container to execute an instance of a target microservice based on hardware resource availability.

Example 5 includes one or more examples, wherein the programmable data plane pipeline is configured to program at least one programmable data plane pipeline in at least one network device associated with a target microservice within the service mesh, wherein to program at least one programmable data plane pipeline in at least one network device comprises program one or more of: a reliable transport protocol, encryption and decryption scheme, and/or telemetry reporting.

Example 6 includes one or more examples, wherein the programmable data plane pipeline is configured to provide microservice-to-microservice communications within a service mesh by communication with a service mesh controller and wherein the communication with a service mesh controller comprises communication between an instance of Istio with an Envoy application program interface (API).

Example 7 includes one or more examples, and includes a method comprising: in programmable packet processing pipelines of network devices associated with a service mesh of microservices, performing selection of microservices for execution and providing communication within the service mesh of microservices.

Example 8 includes one or more examples, wherein the network devices comprise a switch that includes a programmable packet processing pipeline and wherein the programmable packet processing pipeline of the switch performs microservice load balancing and traffic management.

Example 9 includes one or more examples, wherein the network devices comprise a network interface controller that includes a programmable packet processing pipeline and wherein the programmable packet processing pipeline of the network interface controller communicates messages between microservices using a reliable transport protocol.

Example 10 includes one or more examples, wherein the network devices comprise a network interface controller that includes a programmable packet processing pipeline, wherein the programmable packet processing pipeline of the network interface controller is associated with a gateway to a service mesh, and wherein the packet processing pipeline of the network interface controller associated with a gateway performs one service-to-one port binding, implementation of a reliable transport protocol, packet encryption or decryption, and telemetry reporting.

Example 11 includes one or more examples, and includes configuring the programmable packet processing pipelines of network devices associated with a service mesh of microservices by communication with a service mesh controller, wherein the communication with a service mesh controller comprises communication between an instance of Istio with an Envoy application program interface (API).

Example 12 includes one or more examples, and includes receiving a request to perform a service at a gateway among the network devices associated with a service mesh of microservices, wherein the gateway performs protocol translation and provides the request to a switch among the network devices associated with a service mesh of microservices.

Example 13 includes one or more examples, and includes at the switch: selecting an instance of a microservice to execute; sending a request to execute the selected microservice; and receiving a response to the request to execute the selected microservice, wherein the response comprises data to forward or a request to perform a second microservice.

Example 14 includes one or more examples, wherein the microservices of the mesh of microservices execute on a server, a network device, and/or an infrastructure processing unit (IPU).

Example 15 includes one or more examples, and includes a non-transitory computer-readable medium comprising instructions, that if executed by one or more processors, cause the one or more processors to: configure a data plane of a switch to: select a microservice to execute in response to a service request received at a service mesh and configure at least one network device associated with the service mesh to apply a reliable transport protocol to communicate with the switch, wherein the configure at least one network device associated with the service mesh to apply a reliable transport protocol to communicate with the switch comprises configure at least one data plane of the at least one network device to apply a reliable transport protocol to communicate with the switch.

Example 16 includes one or more examples, wherein the switch is to perform load balancing of microservice execution and traffic management within the service mesh.

Example 17 includes one or more examples, wherein the at least one network device associated with the service mesh comprises a network interface controller and/or an infrastructure processing unit (IPU).

Example 18 includes one or more examples, wherein the reliable transport protocol to communicate with the switch is based on Address Family of eXpress Data Path (AF_XDP) socket queues for acknowledgment of packet receipt and received packet re-ordering.

Example 19 includes one or more examples, and includes instructions stored thereon, that if executed by one or more processors, cause the one or more processors to: configure a gateway network device to perform protocol translation to a transport protocol used in the service mesh and provide the received service request to the switch.

Example 20 includes one or more examples, wherein the microservice executes on a server, a network device, and/or an infrastructure processing unit (IPU).

The invention claimed is:

1. A system comprising:
switch circuitry comprising programmable data plane pipeline circuitry, wherein the programmable data plane pipeline circuitry is configured to provide microservice-to-microservice communications within a service mesh;
wherein:
the programmable data plane pipeline circuitry comprises match-action circuitry;
the match-action circuitry comprises match table data and an action engine;
the action engine is to compare header field data of packet data received by the switch circuitry with the match table data to determine one or more actions to be applied to the packet data by the action engine; and
the one or more actions are to implement, at least in part, microservice selection, load balancing, and telemetry processing to be comprised, at least in part, in providing the microservice-to-microservice communications.

2. The system of claim 1, wherein to provide microservice-to-microservice communications within a service mesh, the programmable data plane pipeline circuitry is to perform a forwarding operation for a communication from a first microservice to a second microservice.

3. The system of claim 2, wherein to perform a forwarding operation for a communication from a first microservice to a second microservice, the programmable data plane pipeline circuitry is to utilize a reliable transport protocol.

4. The system of claim 1, wherein the programmable data plane pipeline circuitry is to select a processor, virtual machine, or container to execute an instance of a target microservice based on hardware resource availability.

5. The system of claim 1, wherein the programmable data plane pipeline circuitry is configured to program at least one programmable data plane pipeline in at least one network device associated with a target microservice within the service mesh, wherein to program at least one programmable data plane pipeline in at least one network device comprises program one or more of: a reliable transport protocol, encryption and decryption scheme, and/or telemetry reporting.

6. The system of claim 1, wherein the programmable data plane pipeline circuitry is configured to provide microservice-to-microservice communications within a service mesh by communication with a service mesh controller and wherein the communication with a service mesh controller comprises communication between an instance of Istio with an Envoy application program interface (API).

7. A method comprising:
in programmable packet processing pipeline circuitry of at least one of network devices associated with a service mesh of microservices, performing selection of microservices for execution and providing communication within the service mesh of microservices;
wherein:
the programmable packet processing pipeline circuitry comprises match-action circuitry;
the match-action circuitry comprises match table data and an action engine;
the action engine is to compare header field data of received packet data with the match table data to determine one or more actions to be applied to the received packet data by the action engine; and
the one or more actions are to implement, at least in part, (1) the selection of the microservices, and (2) load balancing and telemetry processing to be comprised, at least in part, in the providing of the communication.

8. The method of claim 7, wherein the network devices comprise a switch that includes the programmable packet processing pipeline circuitry and wherein the programmable packet processing pipeline circuitry of the switch performs microservice load balancing and traffic management.

9. The method of claim 7, wherein the network devices comprise a network interface controller that includes a programmable packet processing pipeline and wherein the programmable packet processing pipeline of the network interface controller communicates messages between microservices using a reliable transport protocol.

10. The method of claim 7, wherein the network devices comprise a network interface controller that includes a programmable packet processing pipeline, wherein the programmable packet processing pipeline of the network interface controller is associated with a gateway to a service mesh, and wherein the packet processing pipeline of the network interface controller associated with a gateway performs one service-to-one port binding, implementation of a reliable transport protocol, packet encryption or decryption, and telemetry reporting.

11. The method of claim 7, comprising:
configuring the programmable packet processing pipeline circuitry by communication with a service mesh controller, wherein the communication with a service mesh controller comprises communication between an instance of Istio with an Envoy application program interface (API).

12. The method of claim 7, comprising:
receiving a request to perform a service at a gateway among the network devices associated with a service mesh of microservices, wherein the gateway performs protocol translation and provides the request to a switch among the network devices associated with a service mesh of microservices.

13. The method of claim 12, comprising:
at the switch:
selecting an instance of a microservice to execute;
sending a request to execute the selected microservice; and
receiving a response to the request to execute the selected microservice, wherein the response comprises data to forward or a request to perform a second microservice.

14. The method of claim 7, wherein the microservices of the mesh of microservices execute on a server, a network device, and/or an infrastructure processing unit (IPU).

15. A non-transitory computer-readable medium storing instructions, that if executed by one or more processors, result in the one or more processors performing operations comprising:
configure a data plane of a switch to:
select a microservice to execute in response to a service request received at a service mesh; and
configure at least one network device associated with the service mesh to apply a reliable transport protocol to communicate with the switch, wherein the configure at least one network device associated with the service mesh to apply a reliable transport protocol to communicate with the switch comprises configure at least one data plane of the at least one network device to apply a reliable transport protocol to communicate with the switch;
wherein:
the data plane comprises programmable data plane pipeline circuitry that comprises match-action circuitry;
the match-action circuitry comprises match table data and an action engine;
the action engine is to compare header field data of packet data received by the switch with the match table data to determine one or more actions to be applied to the packet data by the action engine; and
the one or more actions are to implement, at least in part, microservice selection, load balancing, and telemetry processing to be comprised, at least in part, in providing microservice-to-microservice communications.

16. The computer-readable medium of claim 15, wherein the switch is to perform load balancing of microservice execution and traffic management within the service mesh.

17. The computer-readable medium of claim 15, wherein the at least one network device associated with the service mesh comprises a network interface controller and/or an infrastructure processing unit (IPU).

18. The computer-readable medium of claim 15, wherein the reliable transport protocol to communicate with the switch is based on Address Family of eXpress Data Path (AF_XDP) socket queues for acknowledgment of packet receipt and received packet re-ordering.

19. The computer-readable medium of claim 15, comprising instructions stored thereon, that if executed by one or more processors, cause the one or more processors to:
configure a gateway network device to perform protocol translation to a transport protocol used in the service mesh and provide the received service request to the switch.

20. The computer-readable medium of claim 15, wherein the microservice executes on a server, a network device, and/or an infrastructure processing unit (IPU).

* * * * *